Dec. 8, 1959 E. H. GATZERT 2,916,555

RESTRICTED SERVICE TELEPHONE SYSTEM

Filed Oct. 12, 1956 13 Sheets-Sheet 1

INVENTOR.
ERNEST H. GATZERT
BY Henry H. Gage
AGENT

TRUNK ADAPTER CCT.

Dec. 8, 1959 E. H. GATZERT 2,916,555

RESTRICTED SERVICE TELEPHONE SYSTEM

Filed Oct. 12, 1956 13 Sheets-Sheet 3

TRUNK TERMINATION TT 30

TRUNK ADAPTER CCT.

TRUNK ADAPTER CCT.

Dec. 8, 1959 E. H. GATZERT 2,916,555

RESTRICTED SERVICE TELEPHONE SYSTEM

Filed Oct. 12, 1956 13 Sheets-Sheet 6

Dec. 8, 1959 E. H. GATZERT 2,916,555

RESTRICTED SERVICE TELEPHONE SYSTEM

Filed Oct. 12, 1956 13 Sheets-Sheet 8

Dec. 8, 1959 E. H. GATZERT 2,916,555

RESTRICTED SERVICE TELEPHONE SYSTEM

Filed Oct. 12, 1956 13 Sheets-Sheet 10

2nd. DGT. TRANSLATOR

Dec. 8, 1959 E. H. GATZERT 2,916,555

RESTRICTED SERVICE TELEPHONE SYSTEM

Filed Oct. 12, 1956 13 Sheets-Sheet 11

1st. DIGIT INTERPRETER

Dec. 8, 1959 E. H. GATZERT 2,916,555

RESTRICTED SERVICE TELEPHONE SYSTEM

Filed Oct. 12, 1956 13 Sheets-Sheet 12

2nd. DIGIT INTERPRETER

Dec. 8, 1959 E. H. GATZERT 2,916,555

RESTRICTED SERVICE TELEPHONE SYSTEM

Filed Oct. 12, 1956 13 Sheets-Sheet 13

ACTUATOR CIRCUIT 2,916,555

RESTRICTED SERVICE TELEPHONE SYSTEM

Ernest H. Gatzert, Rochester, N.Y., assignor to General Dynamics Corporation, Rochester, N.Y., a corporation of Delaware Application October 12, 1956, Serial No. 615,624

21 Claims. (Cl. 179—18)

My invention relates to telephone systems in general and more particularly to interoffice trunking systems in which service restrictions are imposed.

In the past, it has been the practice to provide service restriction apparatus associated with the terminations of trunk lines interconnecting offices such as a private branch exchange and a dial central office where connections may be established from private branch exchange stations over the interconnecting trunk lines to destinations in the central office. The apparatus in the trunk line termination at the private branch exchange which is effective for repeating directive signals transmitted from the calling station to the trunk line and central office switching apparatus is also effective for causing the service restricting apparatus in the private branch exchange to register the value of the transmitted signals. The restricting apparatus is thereafter effective in response to the registration of certain signals which characterize a prohibited destination, such as the toll operator position, for blocking the connection by releasing the central office switching apparatus or by other suitable methods.

With the growth in complexity of telephone switching systems, it has become necessary to provide apparatus capable of prohibiting the extension of a plurality of such connections which are characterized by a corresponding plurality of combinations of directive signals. It may also be required that the signal combinations be unique to the system in which the restrictions are employed, and further that the apparatus should be easily modified in order to meet changing restriction requirements within the system. While restriction of connections characterized by a single group of successive signals does not pose a serious problem in presently existing service restricting systems, the requirement of additional registering and translating apparatus in each line termination for the purpose of restricting a plurality of multisignal destinations raises the cost per termination to the point where other solutions to the problem of service restriction become more practical.

Accordingly, it is an object of my invention to provide a new and improved telephone system capable of restricting service to certain destinations accessible over a trunk line.

It is another object of my invention to provide apparatus for restricting service over a group of telephone lines at reduced cost.

It is another object of my invention to provide the apparatus for restricting service over telephone lines which is readily adaptable to meet the changing requirements of the telephone system.

It is another object of my invention to provide service restricting apparatus which is capable of indicating its own failure to function properly to an operator.

In order to accomplish these and other objects, I have provided a telephone system comprising a dial private branch exchange interconnected to a dial central office by a plurality of trunk lines. Each line terminates at the private branch exchange in a termination circuit including means for seizing the line and for thereafter repeating directive signals over the line in order to operate switching apparatus within the central office. Any station within the private branch exchange is capable of operating well known means for the purpose of establishing a connection between itself and an idle trunk line termination, thereby operating the trunk line seizing means and making the trunk seizing means thereafter operative to repeat directive signals under the control of impulse transmitting means, such as a dial at the calling private branch exchange station. In addition to being effective for repeating directive signals to the trunk line, the repeating means is effective for operating means individual to the terminating circuit for registering the value of each signal in the group of directive signals to be repeated over the trunk line. Also provided within the terminating circuit are blocking means for rendering the seizing means ineffective and dismissing means for making the registering means inoperative. The functions of the latter elements will be brought out subsequently.

Common to the plurality of such terminating circuits, actuating means is provided for controlling the blocking means and dismissing means of any terminating circuit. In order to render the actuating means effective with respect to a particular circuit, lockout means common to terminations is operative in response to the registration of a predetermined number of directive signals forming a group or code of signals within the registering means of any terminating circuit to which a call has been extended. The lockout means is effective for operating interconnecting means individual to the one of the terminating circuits in which the fully operated registering means is located. The operation of the interconnecting means is effective for making signal interpreting means, also common to the line terminations, operative under the control of the registering means in which the code of signals is stored. In this manner, the interpreting means is operated in a manner unique to the particular group of signals stored in the registering means. In the event that the group of signals stored in the registering means represents signals required to reach a restricted destination in the central office, the interpreting means operates the actuating means in a first manner. Operation of the actuating means in the first manner is effective in response to the operation of the interconnecting means for operating the blocking means individual to the termination through which the call is being extended. Operation of the blocking means at this time is effective for preventing the extension of the call over the trunk line by making the repeating means ineffective to repeat further signals transmitted from the calling station and releasing the trunk line. Similarly, in the event that the group of signals stored in the registering means represents the directive signals required to reach a non-restricted destination, the interpreting means operates the actuating means in a second manner. The operation of the actuating means in the second manner is effective in response to the operation of the interconnecting means for operating the dismissing means associated with the termination through which a call is being extended.

The operation of either the blocking means or the dismissing means is effective for restoring the registering means to its normal condition. The restoration of the registering means is effective for restoring the interconnecting means, lockout means, interpreting means, and actuating means to their normal conditions in order to free the common elements for use in determining whether or not other calls subsequently extended over other interoffice lines are intended for restricted or unrestricted designations.

For a better understanding of my invention, reference is made to the drawings accompanying and forming a part of this specification, in which:

Fig. 1 shows a block diagram of the system in which the preferred embodiment of my invention is incorporated;

Fig. 2*a* shows a skeletonized representation of a private branch exchange switching system;

Fig. 2*c* shows a schematic representation of a private branch exchange operator trunk termination;

Fig. 3 shows a schematic representation of a private branch exchange trunk line termination;

Figs. 2*b* and 4–8 show a schematic diagram of an adapter circuit individually associated with the trunk termination of Fig. 3;

Fig. 9*a* shows a schematic representative of a lockout circuit;

Fig. 9*b* shows a schematic representation of an alarm circuit;

Figs. 10*a* and 10*b* show a schematic representation and a block diagram, respectively, of translator circuits;

Fig. 15 shows the order in which Figs. 2–14 are to be arranged.

Figure 1:
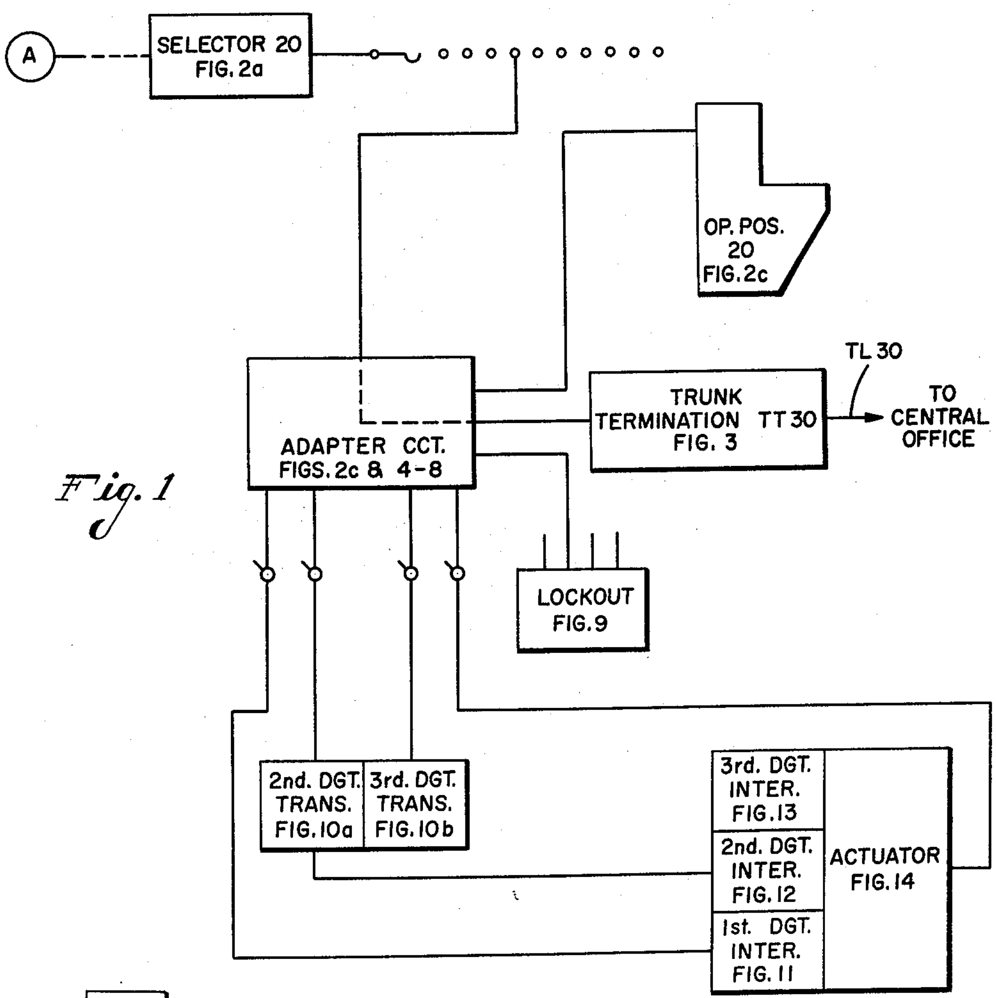
Figure 15:
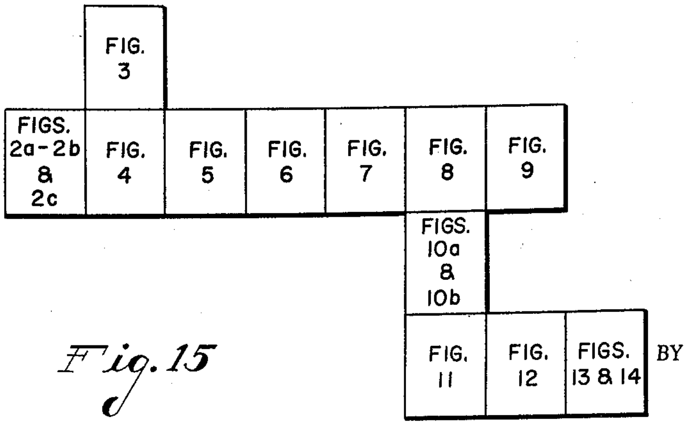

The apparatus referred to in the following description is made to function from first and second sources of power. The first is a source of direct current such as a battery. The most positive plate or terminal of the battery is connected to ground, and is hereinafter referred to as "ground" and in the drawings as (+). The conductor connected to the most negative terminal or plate of the battery is hereinafter referred to as "battery" and in the drawings as (—). The second source of power comprises a source of direct current signals and alternating current tone signals which will be described in the paragraphs which follow.

Figures 2A, 2B, 2C:
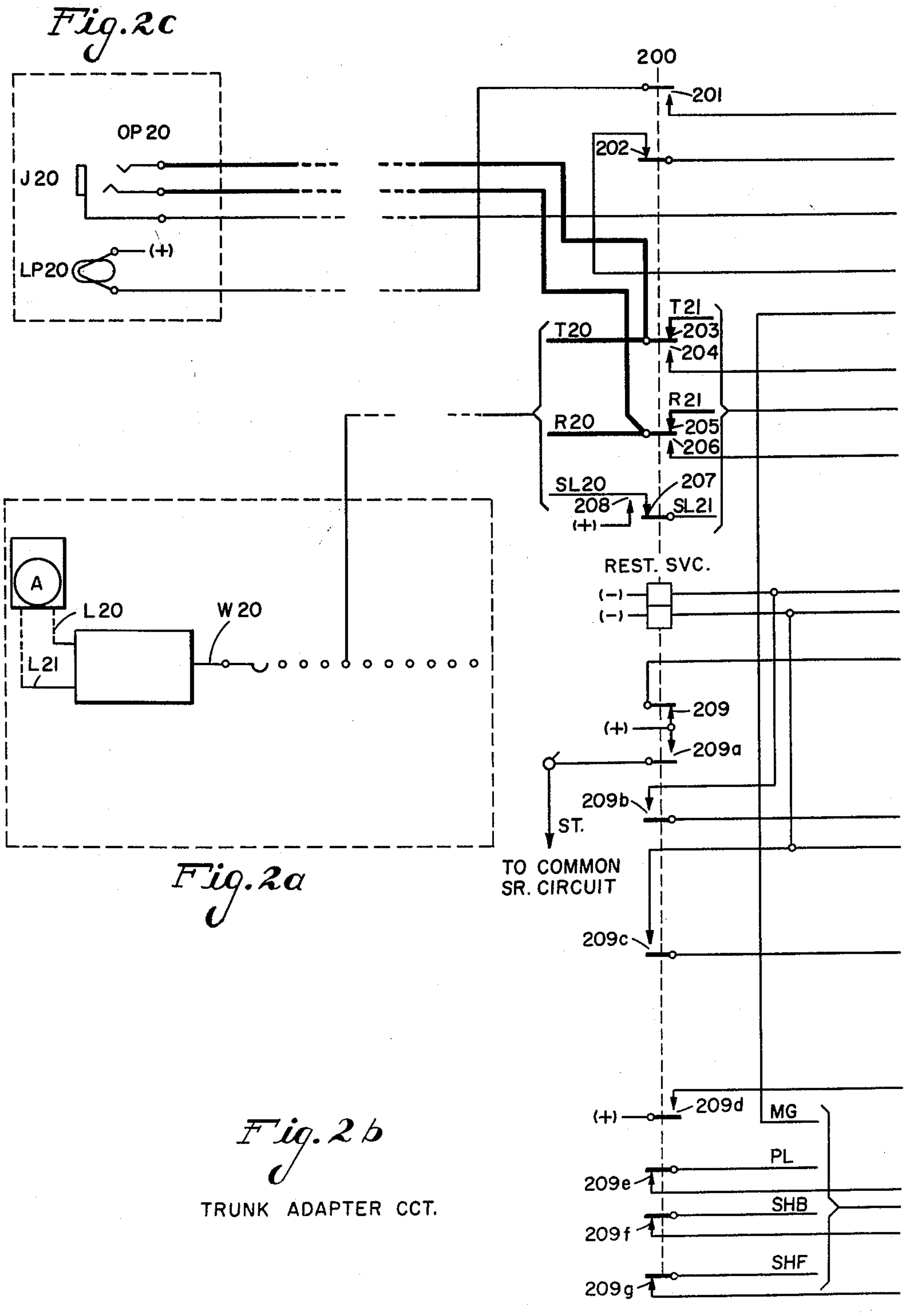
Figure 3:
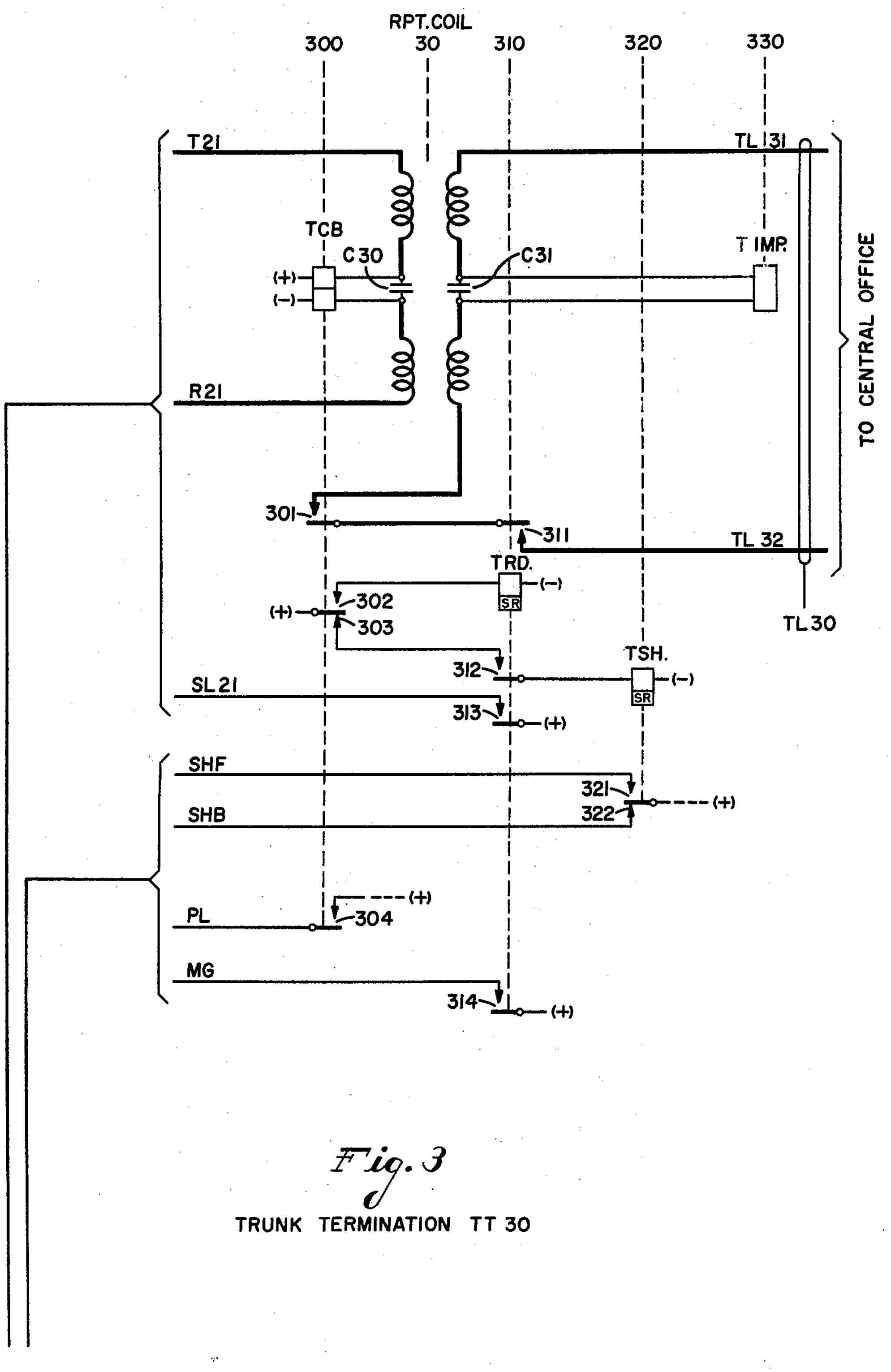
Figure 4:
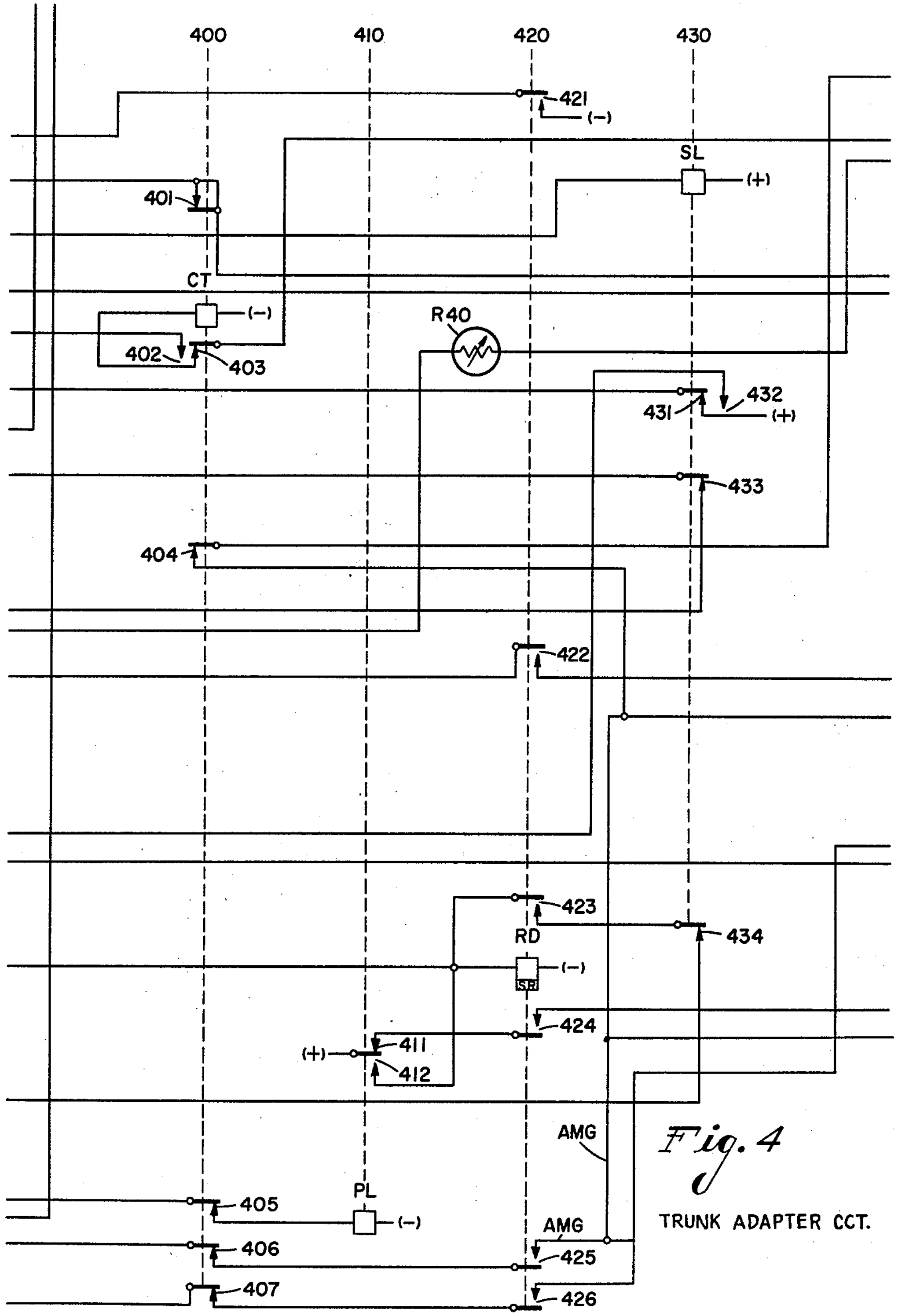
Figure 5:
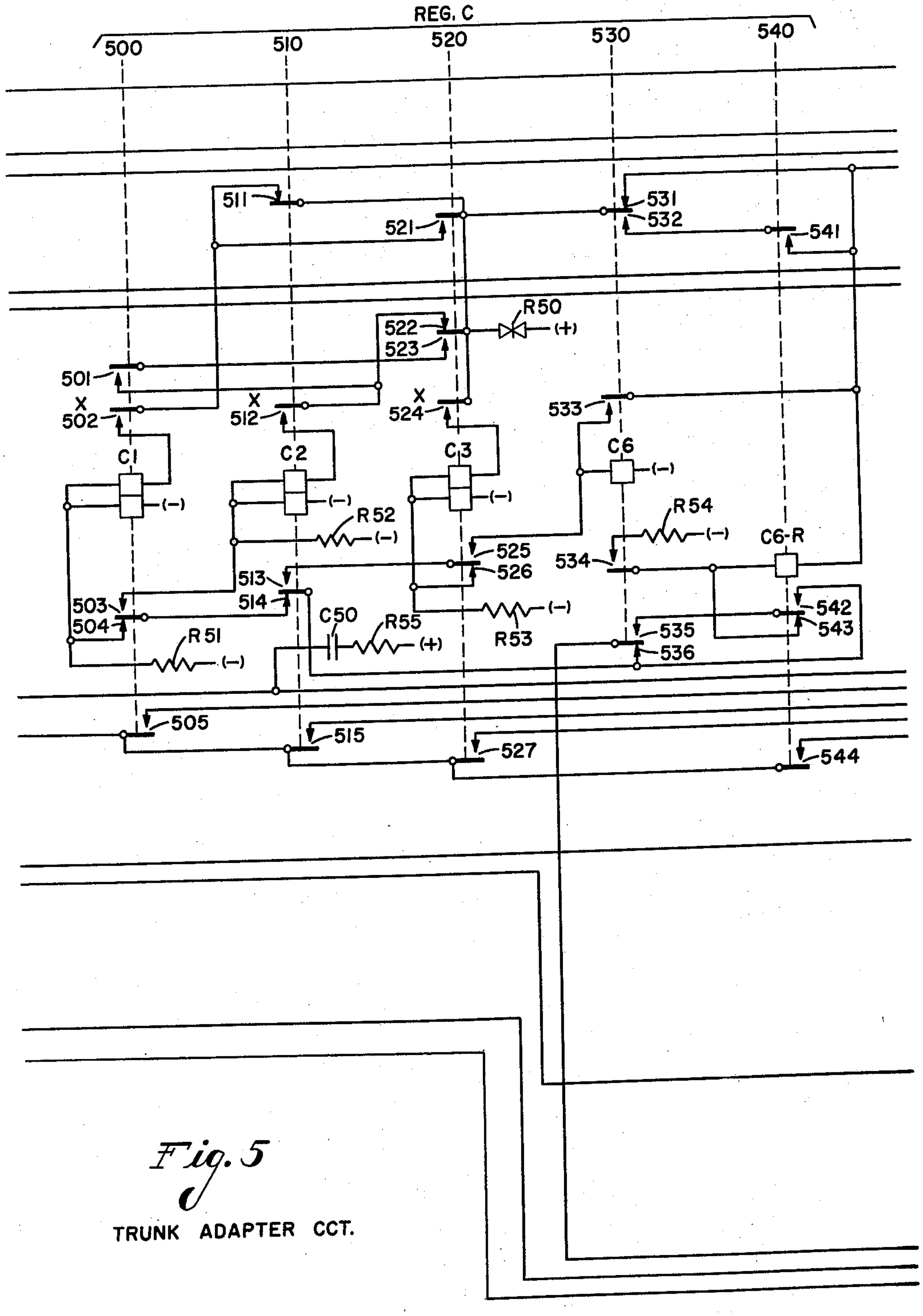
Figure 6:
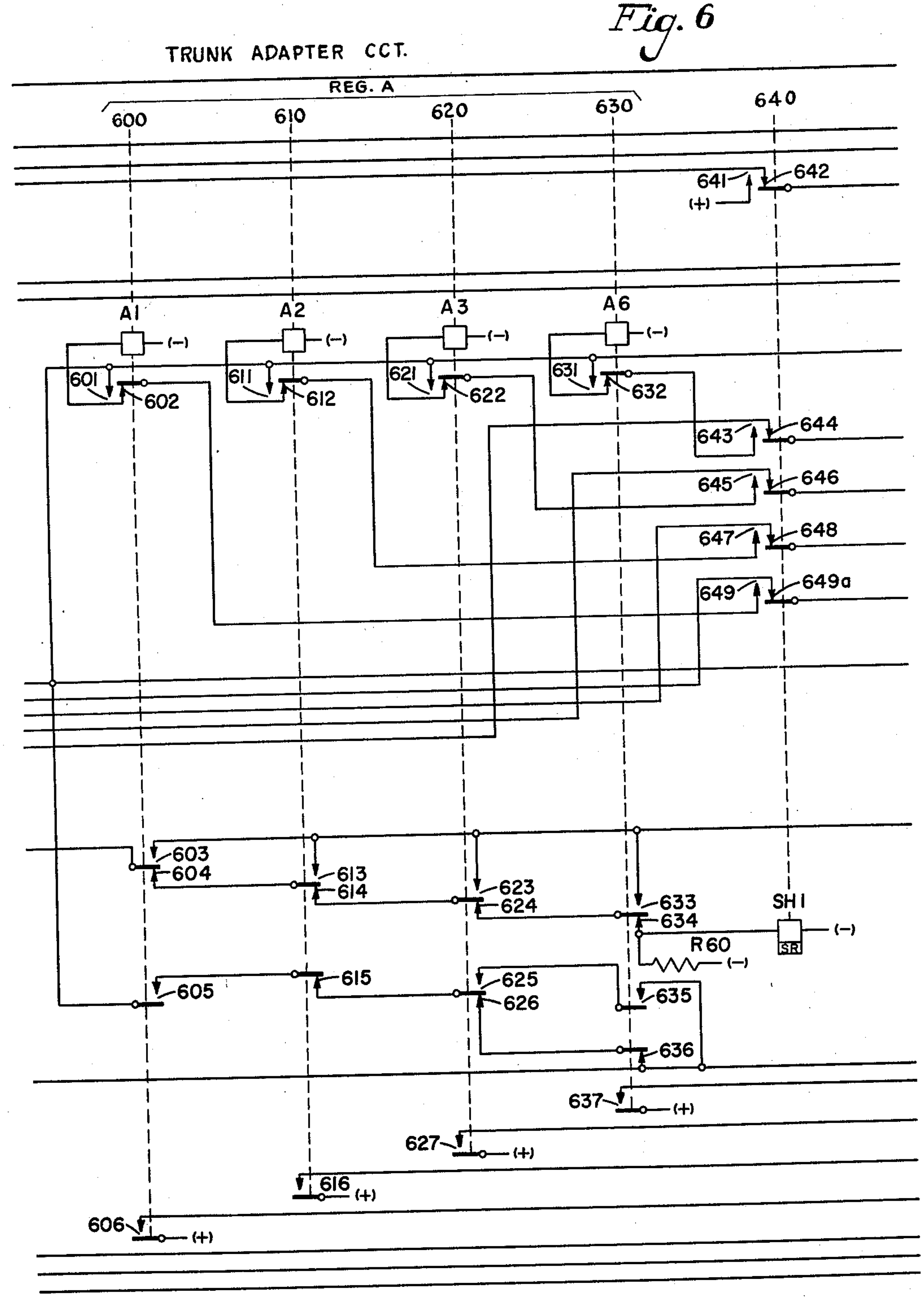
Figure 7:
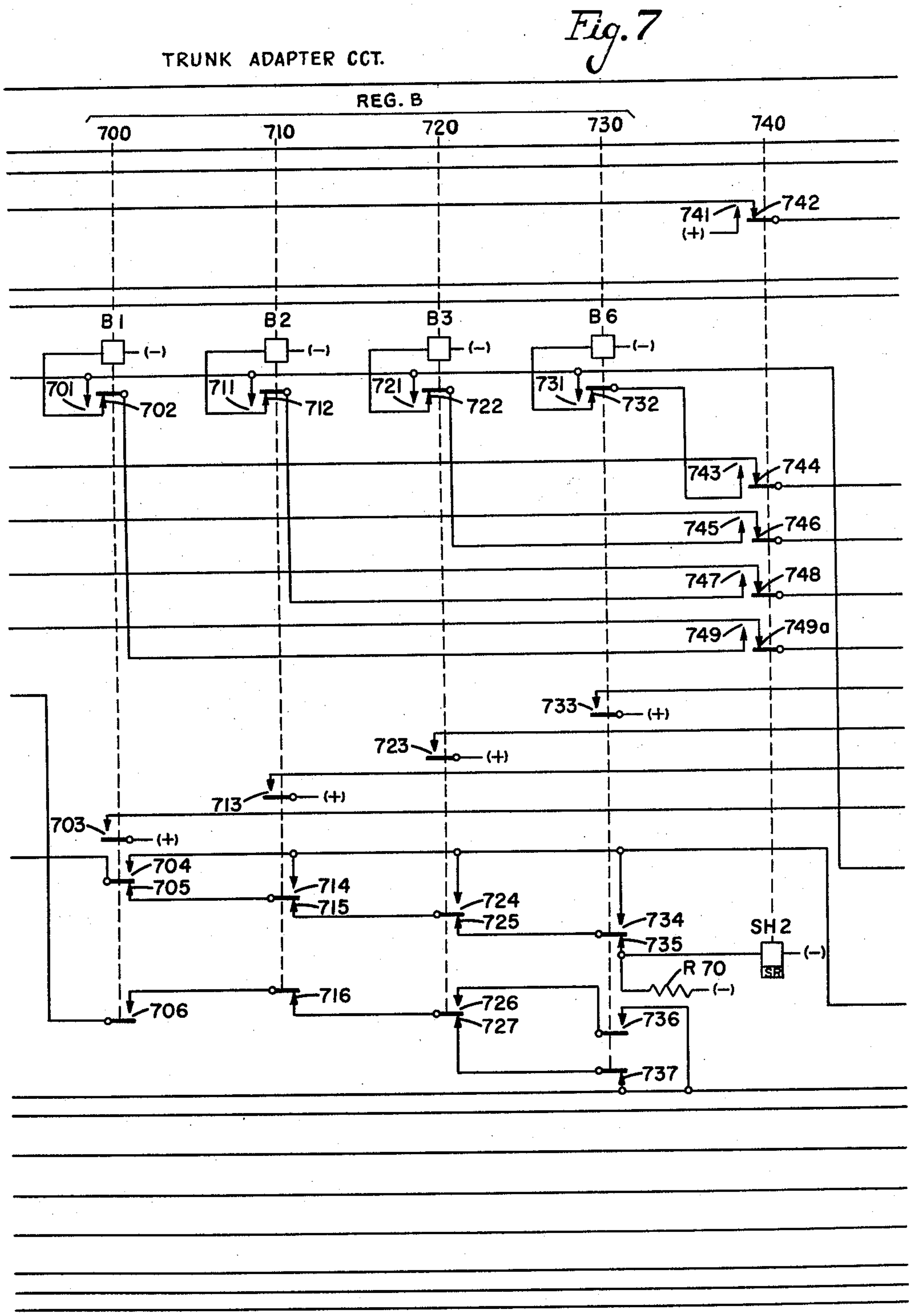
Figure 8:
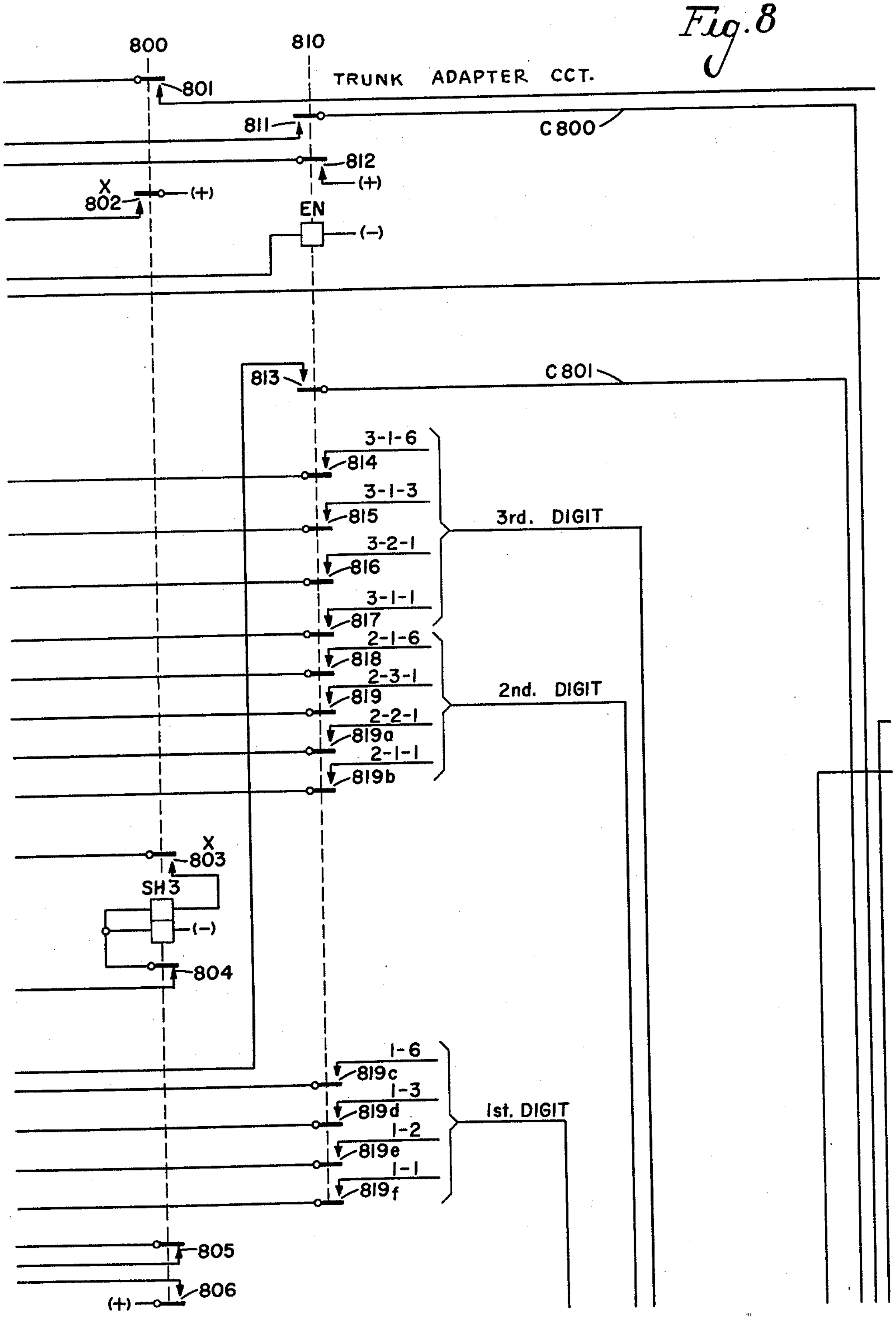

The private branch exchange in which the preferred embodiment of my invention can be incorporated is of the well known step-by-step type. Within the private branch exchange system, lines from stations, such as A, may extend connections through switching apparatus of the well known step-by-step type, such as selector 20 shown in block form in Fig. 2*a*. The private branch exchange system also includes trunk terminations, such as the one shown in Fig. 3. Trunk lines, such as TL30, extend from the terminations to a distant control office (not shown). The system further includes a manual operator position 20 (Fig. 2*c*) to which calls may be extended from the private branch exchange stations.

EXTENDING A CALL FROM A STATION

The manner in which the private branch exchange switching apparatus operates is well understood by those skilled in the telephone art. Therefore, the description of the private branch exchange switching apparatus which follows is confined to generalities because it does not include the apparatus embodying my invention.

When the telephone is removed from its hookswitch at a calling station, such as A, well known means within the private branch exchange extend a connection from the line of calling station A to an idle selector, such as selector 20. The selector is thereupon seized and made responsive to directive signals comprising trains of digit impulses transmitted from the well known calling dial at the calling station A. The receipt of directive signals at selector 20 is effective for advancing the wiper set W20 of selector 20 to a point opposite one of the levels of terminal sets to which the wiper set has access. Upon the selection of any one of the levels in the above-described manner, apparatus within selector 20 effects a hunting operation so that wiper set W20 is advanced within the selected level and into successive engagement with each terminal set within that level until an idle terminal set is located.

Upon the selection of an idle terminal set by the wiper set of selector 20, switchthrough means within selector 20 operates to extend a metallic connection between conductors L20 and L21 of the calling station line to tip and ring terminals and conductors, respectfully, engaged by individual wipers in set W20.

EXTENSION OF A CALL TO THE CENTRAL OFFICE

*Seizure of the termination.*—Upon the establishment in the above described manner of a connection from calling station A to the terminal set of an idle trunk termination, such as TT30, the establishment of the above-described metallic connection from conductor L20 to tip conductor T20 and from conductor L21 to ring conductor R20 is effective to seize termination TT30 in the next described manner. Termination TT30 has means including trunk calling bridge relay 300 for seizing termination TT30 and line TL30 and for thereafter repeating, in the manner to be presently explained, directive signals from calling station A over trunk line TL30 to the central office at which trunk line TL30 terminates.

The operating circuit for relay 300 is completed by the extension of the above-described connecting from calling station A to conductors T20 and R20 and is traced as follows: from ground through the upper winding of relay 300, the upper left-hand winding of repeat coil RPT30, conductor T21, break contacts 203, conductor T20, over the previously described connection through selector 20 to conductor L20, through well known dial contacts at station A and other station A apparatus, conductor L21, the previously described connections through selector 20, conductor R20, break contacts 205, conductor R21, the lower left-hand winding of repeat coil RPT30, and the lower winding of relay 300 to battery.

The operation of relay 300 is effective for closing an obvious operating circuit for trunk release delay relay 310 at make contacts 302. Relay 310 operates at this time. The operation of relay 300 is further effective for operating means including make contacts 304 for repeating trains of directive impulses to the trunk adapter circuit shown in Figs. 2*b* and 4–8 in a manner to be explained presently.

The operation of relay 310 is effective for transmitting holding ground to the selector 20 through which the call is established by connecting ground to conductor SL20. The circuit is traced from ground through make contacts 313, conductor SL21, break contacts 207, and conductor SL20 to selector 20. The switching apparatus in the private branch exchange including selector 20 which is used to establish a connection between the calling station A and termination TT30 is held operated in the well known manner so long as ground is maintained on conductor SL20. The operation of relay 310 is further effective for connecting ground to master ground conductor MG at make contacts 314, and for preparing an operating circuit for trunk shunt relay 320 at make contacts 312.

The operation of relays 300 and 310 is jointly effective for completing a circuit for seizing apparatus at the central office for extending the connection through the central office. Seizure is effected by completing a short between conductors TL31 and TL32 of trunk line TL30. The latter circuit is traced from conductor TL31 through the upper right-hand winding of repeat coil RPT30, the winding of trunk impedance 330, the lower right-hand winding of RPT30, and make contacts 301 and 311 to conductor TL32.

*Transmitting directive signals over the trunk line.*—Following the above-described seizure operation, the operation of the calling station dial is effective to transmit trains of directive impulses to relay 300. Each impulse in each train is represented by a momentary opening of the above-described operating circuit of relay 300. Thus, relay 300 which is normally operated after seizure is released in response to each impulse so received. It is pointed out that relay 310 is of the slow release type, and remains operated during the time that relay 300 is released during the transmission of an impulse train even though the operating circuit for relay 310 is momentarily opened at make contacts 302. Thus, it is seen that the repeating operation of relay 300 is effective for repeating impulse trains over trunk line TL30 by opening and reclosing the above-traced short between conductors TL31 and TL32 at make contacts 301. For purposes of demonstration, it is assumed that the first three digit impulse trains form a group of office code signals to be transmitted from station A over trunk line TL30.

During the transmission of each impulse train and while relay 300 is in its released condition, a circuit is completed for operating trunk shunt relay 320 from ground through break contacts 303, make contacts 312, and the winding of relay 320 to battery. The operation of relay 320 is effective for connecting ground to conductor SHF and for disconnecting ground from conductor SHB at make contacts 321 and break contacts 322, respectively, with effects which are to be explained presently.

REGISTRATION OF THE DESTINATION OFFICE CODE

An adapter circuit such as the one shown in Figs. 2*c* and 4–8 is individually connected to each trunk termination such as TT30. The adapter circuit includes apparatus used for registering the value of each of a fixed number of signals and which represent the office code of the station to which a connection is to be extended from calling station A. The adapter includes a pulsing relay 410 and a plurality of registers such as A, B and C. Each register includes a plurality of relays effective for recording the number of impulses in one of the office code signals transmitted over trunk line TL30. For the purpose of demonstration, it is assumed that the office code including the digits "328" is to be transmitted over the trunk line.

*Seizure of the trunk adapter.*—Upon the operation of relay 300 and the application of ground to conductor PL in the above-described manner, a circuit is completed for operating pulsing relay 410 from ground through make contacts 304, conductor PL, break contacts 209*e* and 405 and the winding of relay 410 to battery. Relay 410 thereupon operates and is effective for completing an obvious operating circuit for release delay relay 420 at make contacts 412. Relay 420 thereupon operates.

The operation of relay 420 is effective for preparing a locking circuit for itself at make contacts 423. The operation of relay 420 is further effective for extending ground controlled by the shunt relay to adapter master ground conductor AMG from ground through break contacts 322, conductor SHB, break contacts 209*f* and 406, and make contacts 425 to conductor AMG. The operation of relay 420 is further effective for preparing the impulsing circuit controlled by relay PL at make contacts 424, a locking circuit for the relays of registers A and B at make contacts 422, and an energizing circuit for lamp LP20 in the operator position at make contacts 421.

*Operation of the registers.*—Upon the transmission of each impulse train from station A, relay 300 releases in the above-described manner to repeat impulses over trunk TL30. The impulsing operation of relay 300 is further effective for interrupting the above-traced operating circuit of relay 410 at make contacts 304. Relay 410 therefore releases in response to each impulse in the office code group signals transmitted over trunk TL30.

The register A relays, effective for storing the first of the office code signals, include relays 600, 610, 620, 630 and 640. Register B relays, suitable for storing the second transmitted digit, include relays 700, 710, 720, 730 and 740. Register C relays, for storing a third repeated digit, include relays 500, 510, 520, 530 and 540.

Because it is necessary to translate the number of releases of relay 410 into a specific combination of operated relays in each of registers A, B and C, and because special relay circuits must be provided in order to make the relays respond in this manner, it is more economical to provide a single, special relay circuit to be so responsive. Since the register C relays are used for storing the last transmitted digit, I have arranged to directively operate the register C relays in response to each impulsing operation of relay 410 and to transfer the operated combination of the register C relays into the registers A and B, respectively. To this end, at the conclusion of the transmission of the first and second digits, I have provided other means effective for transferring the first and second unique operated combinations of the register C relays representing the first and second office code digits, respectively, into the register A and register B relays. Following each transfer operation, the register C relays are released and prepared to receive the next train of impulses. Thereafter, when the third digit is transmitted, the register C relays are again operative for storing the third and last digit transmitted from the calling station A. The exact operation of the registers A, B and C is next described.

*Registration of a digit by the register C relays.*—The register C is similar to the counting chain described in the application of Ernest H. Gatzert entitled "Impulse Counting Device," Serial No. 518,546, filed June 28, 1955. Register C relays 500, 510, 520, 530 and 540 are operable in response to the impulse repeating operation of relay 410 in unique combinations representing the value of the possible value of digits transmitted to relay 410. The combinations for the number of impulses in a possible digit train are set forth in the Table A below. In the following paragraphs, the operation of the register C relays in response to an impulse train of ten interruptions is described. It is to be understood, however, that the impulse train may include any number of impulses from one to ten.

*Table A*

| Digit: | Relays operated |
|---|---|
| 1 | 500. |
| 2 | 510. |
| 3 | 520. |
| 4 | 500, 520. |
| 5 | 500, 510, 520. |
| 6 | 530, 540. |
| 7 | 500, 530, 540. |
| 8 | 510, 530, 540. |
| 9 | 520, 530, 540. |
| 10 | 500, 520, 530, 540. |

Returning to the consideration of trunk termination TT30, each impulsing operation of relay 300 is effective for closing an operating circuit for trunk shunt relay 320 from ground through break contacts 303, make contacts 312, and the winding of relay 320 to battery. Relay 320, being a slow release type, operates and remains operated during the transmission of a train of impulses by relay 300 even though its operating circuit is momentarily opened at break contacts 303. At the conclusion of the impulsing operation of relay 300, relay 300 comes to rest in its operated position, thereby opening the operating circuit of relay 320 at break contacts 303 for a time interval sufficient to allow relay 320 to release. During each operation of relay 320, ground is removed from the above-described SHB conductor at break contacts 322. Similarly, ground is applied to conductor SHF at make contacts 321. The application of ground to conductor SHF while the register A relays 600, 610, 620 and 630 are in normal condition is effective for operating shunt 1 relay 540 within the trunk adapter. The circuit is traced from grounded conductor SHF through break contacts 209g and 407, make contacts 426, and chain contacts including break contacts 604, 614, 624 and 634 on each of the register A relays and the winding of relay 640 to battery. Thus, relay 640 operates during the transmission of the first impulse train over trunk TL30. At the conclusion of the transmission of the impulse train, ground is removed from conductor SHF by the release of relay 320 in the above-described manner at make contacts 321. The removal of ground from conductor SHF is effective for opening the above described operating circuit for relay 640. Relay 640, being a slow release type, remains operated momentarily after the opening of its operating circuit in the above-described manner with effects which are to be explained presently.

Upon the first release of relay 410 during the transmission of a train of impulses, a circuit is completed for energizing two-step relay 500 through its first step from ground through break contacts 411, make contacts 424, break contacts 805, 536, 514 and 504, and the lower winding of relay 500 to battery. The operation of relay 500 through its first step is effective for closing preliminary make contacts X502. In response to the closing of contacts X502 and to the subsequent reoperation of relay 410, the above-described energizing circuit for the lower winding of relay 500 is opened at break contacts 411. Thereupon a circuit for operating relay 500 through its second step is made effective. The second step operating circuit is traced from battery through the lower and upper windings of relay 500, make contacts X502, break contacts 511 and 531, and make contacts 641 on now operated relay 640 to ground. The operation of relay 500 through its second step is effective for transferring a part of the above-described chain relay impulsing circuit used for energizing the lower winding of relay 500 and which is traced from ground through break contacts 411, make contacts 424, break contacts 805, 536 and 514 from the lower winding of relay 500 at break contacts 504 into connection with the lower winding of two-step relay 510 at make contacts 503.

Upon the second release of relay 420, the connection of ground through break contacts 411 over the above-described circuit to the lower winding of relay 510 is effective for operating relay 510 through its first step. The operation of relay 510 through its first step is effective for closing preliminary make contacts X512. Thereafter, relay 410 reoperates in order to remove ground from the left-hand terminal of the lower winding of relay 510 at make contacts 411. The removal of ground from the left-hand terminal of the windings of relay 510 is effective for completing a circuit for operating relay 510 through its second step from battery through the lower and upper windings of relay 510, make contacts X512, break contacts 522 and 531 and make contacts 641 to ground.

The operation of relay 510 through its second step is effective for opening the above-described second step operating circuit of relay 500 at break contacts 511. Relay 500 thereupon releases. The operation of relay 510 through its second step is also effective for transferring a portion of the above described chain relay impulsing circuit which is traced from ground through break contacts 411, make contacts 424, break contacts 805 and 536 from its connection through make contacts 503 to the left-hand terminal of relay 510 at break contacts 514 into connection with the left-hand terminals of the windings of relay 520 by way of break contacts 526 at make contacts 513.

Upon the transmission of the third impulse caused by the release of relay 410, the above-described circuit is completed for extending ground to the left-hand terminals of the windings of relay 520 and through the lower winding of relay 520 to battery. Relay 520 thereupon operates through its first step. The operation of relay 520 through its first step is effective for closing preliminary make contacts X524. At the conclusion of the third impulse, relay 410 reoperates in order to open the ground connection to the left-hand terminals of the relay 520 winding and thereupon make effective a circuit for fully operating relay 520 through its second step. The latter circuit is traced from battery through the lower and upper windings of relay 520, make contacts X524, break contacts 531, and make contacts 641 to ground. The operation of relay 520 through its second step is effective for opening the above-described second step operating circuit of relay 510 at break contacts 522. Relay 510 thereupon releases. The operation of relay 520 through its second step is further effective for preparing alternate second-step-operating and locking circuits for relays 500 and 510 at make contacts 521 and 523, respectively.

At this point, the released condition of relays 500 and 510 is effective for re-establishing the previously traced chain relay impulsing circuit to the left-hand terminals of the relay 500 winding. Thus upon the transmission of the fourth impulse to relay 410 and the resulting release of relay 410, relay 500 again operates through its first step to reclose preliminary make contacts X502. Upon the reoperation of relay 410 at the end of the fourth impulsing operation, the above referred to alternate second step operating circuit of relay 500 is effective, so that relay 500 again operates through its second step. The latter circuit is traced from battery through the lower and upper windings of relay 500, make contacts X502, break contacts 511 and 531 and make contacts 641 to ground. The operation of relay 500 through its second step is effective for re-establishing the above-described first step operating circuit for relay 510 at make contacts 503 and for further preparing the alternate second step operating circuit for relay 510 at make contacts 501.

Thereupon the transmission of the fifth impulse to relay 410 and the resulting release of relay 410, relay 510 again operates through its first step to close preliminary contacts X502. Upon the operation of make contacts X502 and in response to the subsequent operation of relay 410 at the conclusion of the fifth impulse, the above-mentioned alternate second step operating circuit for relay 510 is completed from battery through the lower and upper windings of relay 510, make contacts X512, 501 and 523, break contacts 531 and make contacts 641 to ground. Relay 510 reoperates through its second step. The operation of relay 510 through its second step is effective for disconnecting the above-traced first step energizing circuit including make contacts 535 and 542 from its connection to the left-hand winding terminals of relay 510 at break contacts 514 and, in response to the operation of relay 520, into connection with a left-hand winding terminal of relay 530 by way of make contacts 525 at make contacts 513.

Upon the transmission of the sixth impulse to relay 410, a circuit for operating relay 530 is completed from ground through break contacts 411, make contacts 424, break contacts 805 and 536, make contacts 513 and 525, and the winding of relay 530 to battery. The operation of relay 530 closes a locking circuit for itself from battery through the winding of relay 530 and make contacts 533 and 641 to ground. The operation of relay 530 is effective for opening the above-described alternate second step operating circuit for relays 500, 510 and 520 at break contacts 531. The latter relays thereupon release. The operation of relay 530 is further effective for preparing alternate second step operating circuits for relays 500, 510 and 520 at make contacts 532. The operation of relay 530 is further effective for preparing an operating circuit for relay 540 at make contacts 534. The subsequent reoperation of relay 410 at the end of the sixth impulse makes effective the circuit for operating relay 540 by removing ground from the left-hand winding terminal of relay 540 caused by the opening of break contacts 411. Relay 540 thereupon operates to further prepare the above referred to alternate second step operating circuits for relays 500, 510 and 520 at make contacts 541, and for preparing alternate first step operating circuits for the same relays at make contacts 542.

Upon the transmission of the seventh impulse to relay 410 and the resulting release of relay 410, the above referred to alternate first step energizing circuit for relay 500 is completed from ground through break contacts 411, make contacts 424, break contacts 805, make contacts 535 and 542, break contacts 514 and 504, and the lower winding of relay 500 to battery. Relay 500 thereupon operates through its first step to close preliminary contacts X502. At the end of the seventh impulse, which is marked by the reoperation of relay 410, the above referred to alternate second step operating circuit for relay 500 is effective to operate relay 500 through its second step. The latter circuit is traced from battery through the lower and upper windings of relay 500, make contacts X502, break contacts 511, and make contacts 521, 532, 541 and 641 to ground. The operation of relay 500 through its second step is effective for opening the previously traced first step operating circuit for relay 500 at break contacts 504 and for preparing the above referred to alternate first step energizing circuit for relay 520 at make contacts 503. The operation of relay 520 through its second step is also effective for closing an alternate second step operating circuit for relay 500 at make contacts 521 and an alternate second stepping operating circuit for relay 510 at make contacts 523.

Thus upon the eighth release of relay 410 in response to the eighth impulse transmitted to relay 410, the lower winding of relay 510 is again energized by ground supplied to the left-hand winding terminals through make contacts 503. Relay 510 thereupon operates through its first step. At the end of the eighth impulse, in response to the release of relay 410 and the resulting removal of ground from the left-hand winding terminals of relay 510, relay 510 operates through its second step over a circuit traced from battery through the lower and upper windings of relay 510 and make contacts X512, break contacts 522, and make contacts 532, 541 and 641 to ground. The operation of relay 510 through its second step is effective for transferring the above referred to alternate first step energizing circuit from the winding of relay 510 at break contacts 514 into connection with the left-hand winding terminals of relay 520 at make contacts 513. The operation of relay 510 through its second step is further effective for opening the above-described alternate second step operating circuit of relay 500 at break contacts 511. Relay 500 thereupon releases.

Upon the transmission of the ninth impulse to relay 410 and the resulting release of relay 410, the above referred to alternate first step operating circuit for relay 520 is completed at break contacts 411 and make contacts 513. Relay 510 thereupon operates to its first step to complete for itself the above referred to alternate second step operating circuit at make contacts X512. The latter circuit is traced from battery through the lower and upper windings of relay 510, make contacts X524, 532, 541 and 641 to ground. The operation of relay 520 through its second step is effective for opening the second step operating relay 510 at break contacts 522. Relay 510 thereupon releases. The operation of relay 520 through its second step is further effective to transfer the alternate first step energizing circuit of relays 500, 510 and 530 from its above-described connection to the lower winding of relay 520 at make contacts 513 and into connection with the lower winding of relay 500 through now closed break contacts 514 and 504.

Upon the transmission of the tenth impulse to relay 410 and the resulting release of relay 410, the above referred to alternate first step energizing circuit of relay 500 is again completed at break contacts 411. Relay 500 thereupon operates through its first step in order to again prepare its alternate second step energizing circuit at make contacts X502. Upon the reoperation of relay 410 at the end of the tenth impulse and the subsequent removal of ground from the left-hand terminals of the relay 500 winding, relay 500 operates through its second step over the then effective alternate second step energizing circuit.

*Transferring the stored digit into the register A relays.*—Thus it is seen that the register C relays are effective for recording and translating the number of digits repeated by relay 300 in trunk termination TT30. In the arrangement shown, relays 600, 610, 620 and 630 of register A correspond to relays 500, 510, 520 and 540, respectively, of register C. At the end of the train of impulses the release of relay 320 in the previously described manner is effective for reapplying ground to conductor SHB before the slow release type relay 640 has restored to its normal condition. Thereupon an energizing circuit is completed for operating the ones of register A relays 600, 610, 620 and 630 corresponding to the operated ones of the register C relays. Each circuit is completed from conductor SHB through break contacts **209*f* and 406, make contacts 425, conductor AMG, and the operated ones of make contacts 505, 515, 527 or 544, now closed make contacts 643, 645, 647 and 649, and break contacts 602, 612, 622 and 632, respectively, to the appropriate ones of the windings of relays 600, 610, 620 and 630. The operated ones of the register A relays are locked from ground supplied through break contacts 209, make contacts 422, appropriate ones of make contacts 601, 611, 621 and 631, and the windings of the corresponding relays to battery. Upon the subsequent release of relay 640, the operating circuits of the register A relays are opened by the disconnection of the above referred to actuating contacts 505, 515, 527 and 544 by disconnecting the windings of the register A relays at make contacts 649, 647, 645 and 643. Assuming that the first office code signal transmitted over trunk line TT30 is the digit "3," relay 620 in register A is left operated after relay 640 releases. The release of relay 640 is further effective for releasing the operated ones of the register C relays by opening the second step operating circuits of those relays at make contacts 641**. The operated register C relays thereupon release in preparation for the registration of the second digit, which is next described.

*Registration of the second digit.*—The transmission of the second train of impulses (the digit "2") from calling subscriber station A to trunk termination TT30 is effective in the previously described manner to cause an impulse repeating operation of relay 300. The impulse repeating operation of relay 300 is also effective in the previously described manner to cause pulsing relay 410 within the trunk adapter circuit to repeat the impulse trains. The impulsing operation of relay 410 is effective, in the manner just explained, to operate the register C counting chain for the purpose of translating the number of impulses into a unique operated combination of relays within register C.

At the conclusion of the registration of the first digit or signal within register A, the operation of any one of the register A relays is effective for disabling shunt 1 relay 640 by opening the previously described operating circuit of the latter relay at any one of the chain contacts including 604, 614, 624 and 634. Therefore, the application of ground to conductor SHF in the previously described manner during the transmission of the second signal of the office code is no longer effective for operating relay 640. The operation of any one of the register A relays is further effective for preparing an operating circuit for shunt 2 relay 740 through any one of make contacts 603, 613, 623 or 633 associated with the chain contacts on register A relays. In the case chosen for discussion, with relay 620 in operated condition, relay 740 is operated during the transmission of the second signal over a circuit traced from conductor SHF (to which ground is applied in the previously described manner) through break contacts 209g and 407, make contacts 426, break contacts 604, make contacts 613, the break contacts of the register B chain including break contacts 705, 715, 725 and 735 and the winding of relay 740 to battery. The operation of relay 740 is effective for supplying ground source for the second step operating circuits of the register C relays through make contacts 741 and break contacts 642 to replace the ground source previously supplied through make contacts 641 on relay 640.

During the transmission of the second signal, the register C relays operate in the previously described manner. In the case chosen for discussion, relay 510 operates in response to the transmission of the second impulse train, shunt relay 320 in termination TT30 again releases to release relay 320 and thereby disconnects ground from conductor SHF in the previously described manner.

At the conclusion of the second impulsing operation of relay 300, relay 320 again releases to remove ground from conductor SHF thus releasing relay 740. The release of relay 320 is also effective in the previously described manner for reapplying ground to conductor SHB at break contacts 322. The application of ground to conductor SHB prior to the release of relay 740 (a slow release type) is effective for transferring the information temporarily stored on the register C relays into the register B relays 700, 710, 720 and 730. Thus the operation of any one of the register C relays is effective in response to the operation of relay 740 and to the application of ground to conductor SHB for completing the operating circuits for the ones of register B relays corresponding to the now operated register C relays. In the case chosen for discussion here, only relay 510 in register C is operated at the conclusion of the second digit transmission; accordingly, the operating circuit of relay 710 within register B is completed over the following circuit: from conductor SHB through break contacts 209f and 406, make contacts 425, conductor AMG, make contacts 515 and 647, break contacts 612, and the winding of relay 610 to battery.

The operation of any one of the register B relays is effective for closing a locking circuit for that relay through make contacts 701, 711, 721 or 731. Thus, a locking circuit may be completed for relay 700 from battery through the winding of that relay, make contacts 701, make contacts 442, and break contacts 209 to ground. Thereafter the operated register B relays are held in operated condition until the above traced locking circuit is opened by the release of release delay relay 420 or the operation of restricted service relay 200.

Upon the previously described release of relay 740, the ground supply for the previously described register C relay second step operating circuits are opened at make contacts 741. Thereupon all operated relays within register C are restored to normal condition in preparation for the transmission of the third and last impulse of the group to be recorded.

*Registration of the third digit.*—The transmission of the third digit from calling station A to trunk termination TT30 is effective in the previously described manner to cause an impulsing operation of relays 300 and 410 and the operation of relay 320. The impulsing operation of the relay 410 is again effective for carrying out the translating operation of register C in the manner next described. The operation of relay 320 is effective for applying ground to conductor SHF in order to operate two-step shunt 3 relay 800 through its first step. The first step operating circuit of relay 800 is traced from grounded conductor SHF through break contacts 209g and 407, make contacts 425, break contacts 604 and 614, make contacts 623, break contacts 705, make contacts 714, break contacts 804, and the lower winding of relay 800 to battery. Shunt 3 relay 800 thereupon operates to the point where preliminary make contacts X802 and X803 are closed. At this time the second step operating circuit for relay 800 is prepared from battery through the lower and upper windings of relay 800, make contacts X803 and 422, and break contacts 209 to ground. The presence of ground on the left-hand winding terminals of relay 800 prevents the second step operating circuit from being effective at this time.

Operation of shunt 3 relay 800 through its first step is further effective for supplying ground to the above-described second step operating circuits of the register C relays at preliminary make contacts X802. The latter ground supply is traced from ground through make contacts X802, break contacts 742 and 642 to the previously described first step operating circuits of relays 500, 510 and 520 and the locking circuits of relays 530 and 540 within register C. Thereupon, the impulsing operation of relay 410 causes the register C relays to operate in the previously described manner. In the case chosen for discussion here, the transmission of the B impulse digit train as a third digit leaves the register C with relays 510, 530 and 540 operated.

At the conclusion of the transmission of the third impulse train from calling station A to trunk termination TT30, relay 300 comes to rest at its operated position. Holding relay 300 in its operated condition is effective to open the operating circuit of relay 320 at break contacts 303 for a length of time sufficient to release that relay. The release of relay 320 is effective in the previously described manner to disconnect ground from conductor SHF at make contacts 321 and to connect ground to conductor SHB at break contacts 322. The removal of ground from conductor SHF removes ground from the left-hand winding terminals of relay 800. The removal of the short from around the upper winding of relay 800 renders the above-described second step operating circuit of relay 800 effective. Relay 800 thereupon becomes fully operated to signal the end of the registration process. The operation of relay 800 through its second step is further effective for disconnecting the impulsing contacts 411 from the register C relays at break contacts 805. Thus the transmission of trains of impulses after the third train has been sent does not affect the register means within the trunk adapter circuit. The operation of relay 800 through the second step is further effective for applying ground to conductor AMG at make contacts 806 in order to supplement the ground supplied through the previously described conductor SHB.

OPERATION OF THE LOCKOUT CIRCUIT

Figures 9A, 9B:
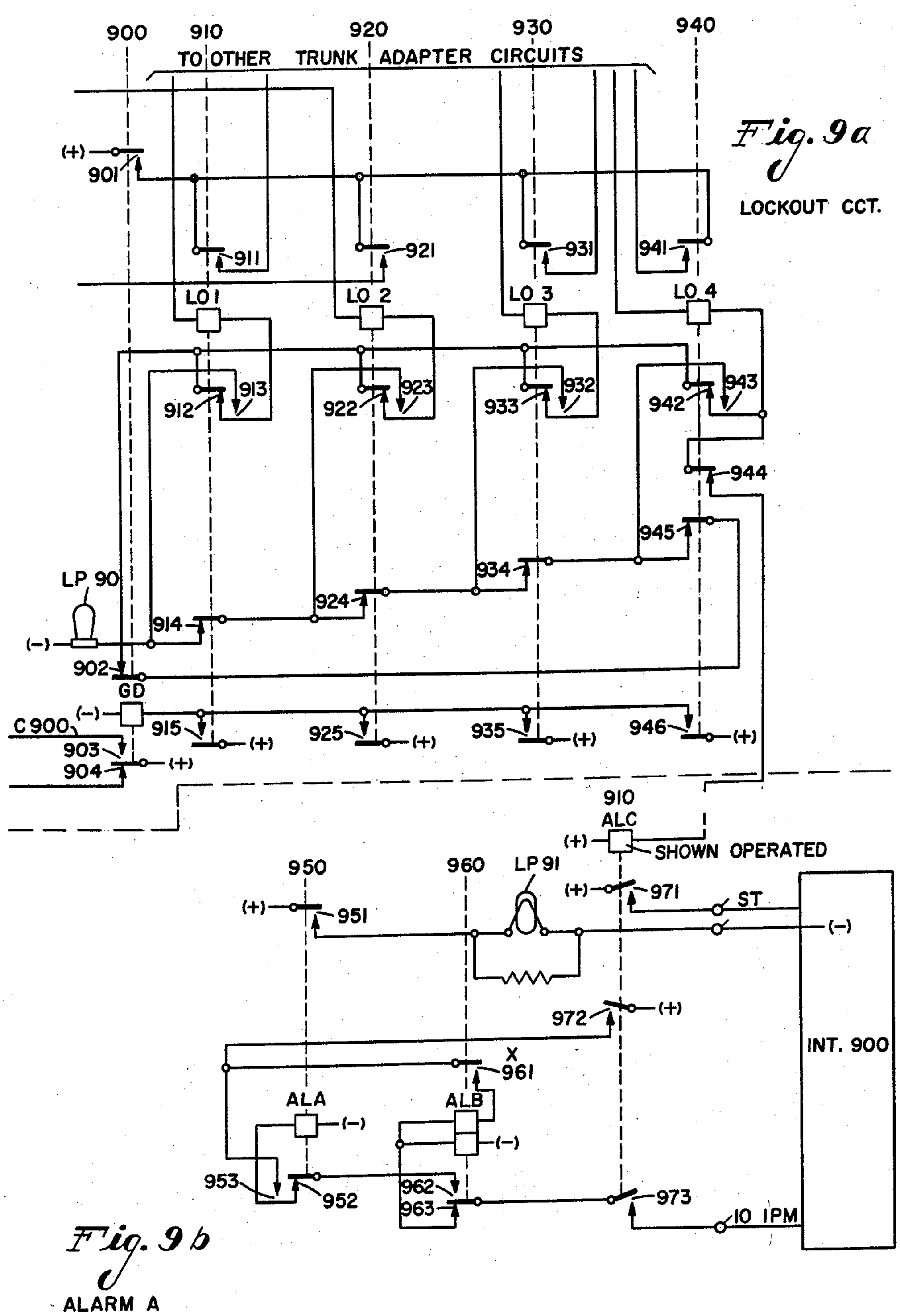

A lockout circuit, such as the one shown in Fig. 9a, is common to a plurality of trunk terminations, such as TT30, and their associated adapter circuits, such as the one shown in Figs. 2b and 4–8. The function of the lockout circuit is to make effective an interpreting means, including further translator circuits and interpreter circuits, all of which are common to the plurality of trunk terminations. One of the functions of the lockout circuit is to control interconnecting means individual to each termination. The interconnecting means is effective for connecting the registers of the corresponding trunk adapter circuit to the common interpreting means. Another function of the lockout circuit is to insure that only one such connection is established at any one time.

To this end, the lockout circuit shown in Fig. 9a is provided with relay means individual to each trunk adapter circuit which is operated in response to the registration of a complete group or code of signals within the registering means of the trunk adapter circuit and which is effective for causing means individual to that adapter circuit to interconnect the registering means and the translator and interpreter circuits. The interconnecting means shown in the preferred embodiment of my invention includes enabling relay 810; in the case being discussed here, lockout 2 relay 920 is individual to the trunk adapter shown in Figs. 2b and 4–8. Other lockout relays, such as 910, are provided for trunk adapter circuits of a lower sequence number within the trunk termination plurality, and still other relays, such as 930 and 940, are provided individual to the trunk adapter circuits having a higher sequence number than the trunk adapter being discussed here.

A common battery supply is used for energizing all the lockout relays. This battery supply is connected through series cutoff contacts to the windings of each lockout relay. The series cutoff contacts are effective in the manner to be described presently for allowing only one lockout relay to be operated at any one time. The cutoff contacts are further effective for giving preference (i.e., the first connection) to the lower sequence numbered trunk circuit in the event the registers within the adapters of two or more trunks become completely operated simultaneously.

Returning to the consideration of the registering means within the trunk adapter circuit, upon the registration of a complete digit group or code within the registering means, the operation of relay 800 through its second step is effective in response to the reapplication of ground to conductor SHB at the conclusion of the transmission of the third digit for energizing lockout 2 relay 920. The energizing circuit for relay 920 is traced from grounded conductor SHB through break contacts 209f and 406, make contacts 425, conductor AMG, break contacts 404, make contacts 801, the winding of relay 920, break contacts 922 and 902, and cutoff break contacts 945, 934, 924 and 914, and ballast lamp LP90 to battery. Relay 920 operates and completes for itself a locking circuit traced from battery through ballast lamp LP90, break contacts 914, make contacts 923, and the winding of relay 920 over the previously described ground applying circuit connected to the left-hand terminal of the relay 920 winding. The operation of relay 920 is further effective for opening the operating circuits of any of the lockout relays, such as 910, 930 and 940 at cutoff break contacts 924. Thereafter no other lockout relay may be operated so long as relay 920 remains in its operated condition. The operation of relay 920 is further effective for applying ground to an obvious operating circuit for guard relay 900 at make contacts 925. Relay 900 thereupon operates with effects which are to be explained presently. The operation of relay 920 is further effective for applying ground to the winding of relay 810 within the trunk adapter individual to relay 920. The latter circuit is traced from ground through make contacts 901 and 921, break contacts 202, and the winding of relay 810 to battery. Relay 810 thereupon operates.

Figures 13, 14:
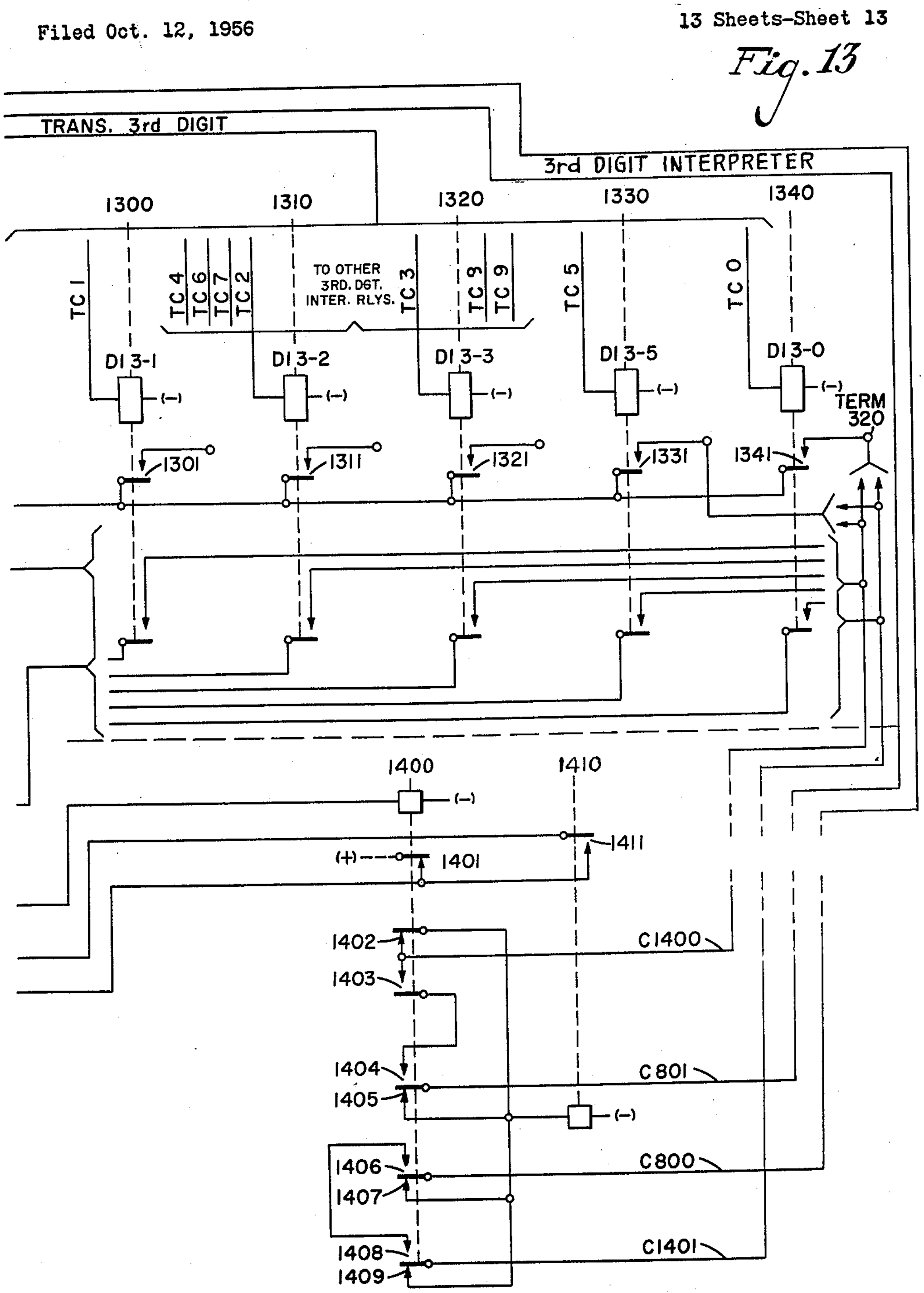
Fig. 14 shows a schematic representation of an actuator circuit.

The operation of relay 810 is effective for connecting the actuating means shown in Fig. 14 which is individually connected with the digit interpreting means to blocking means, including restricted service relay 200, and dismissing means including cut-through relay 400 within the individual trunk adapter circuit. Thus, a connection is extended from "no-go" conductor C801 of the actuating means through make contacts 813 to the lower winding of relay 200 and battery. Similarly, a connection is extended from "go" conductor C800 through make contacts 811, break contacts 403, and the winding of relay 400 to battery. The effects of extending these connections is to be explained presently.

The operation of relay 810 is further effective for applying ground to the lower winding of restricted service relay 200 through a time delay device consisting of thermistor R40. It is to be noted that the initial high resistance of element R40 prevents the immediate operation of relay 200 from ground extended from make contacts 812 for reasons which are to be explained presently.

Figure 10A:
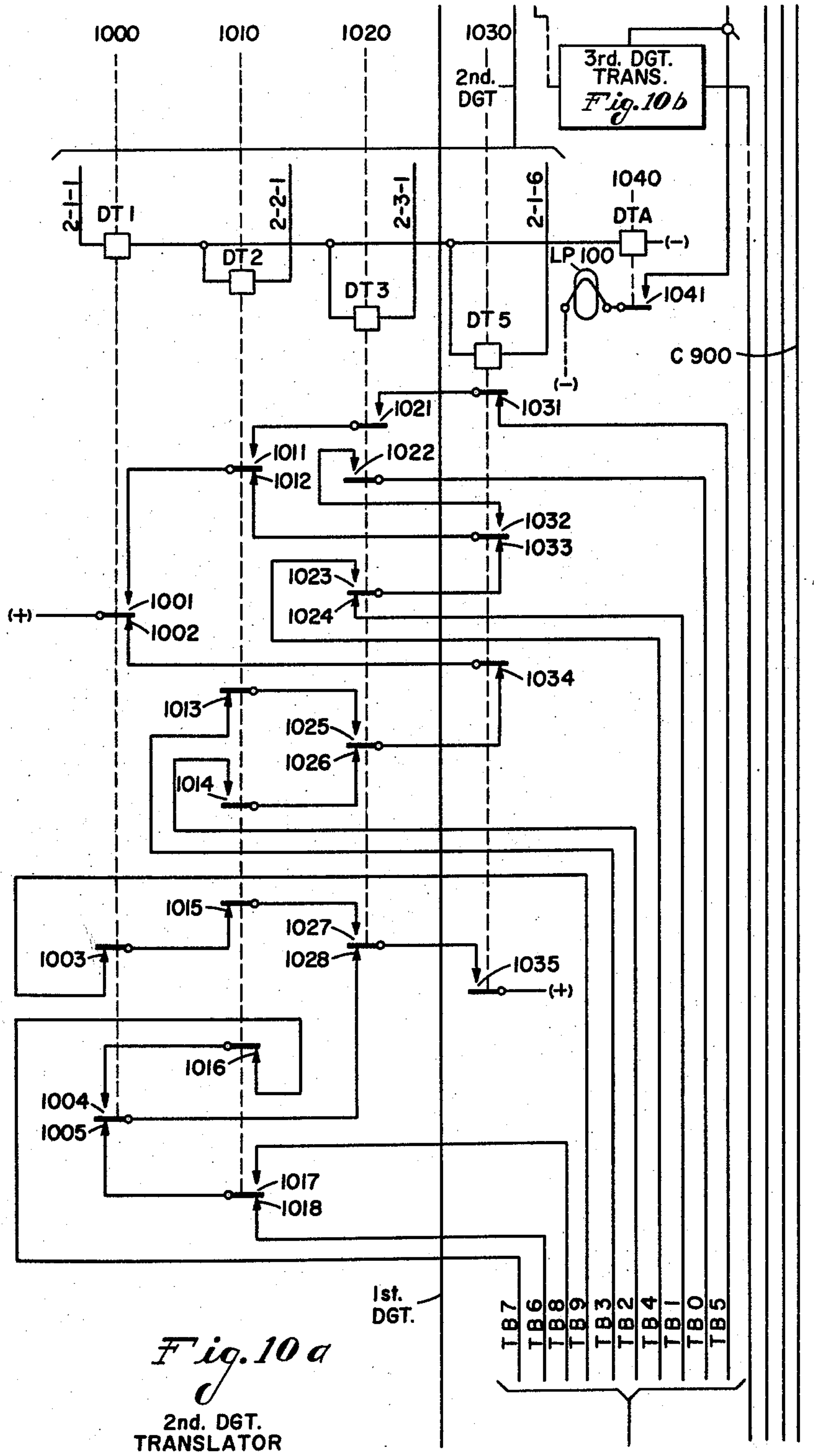
Figure 11:
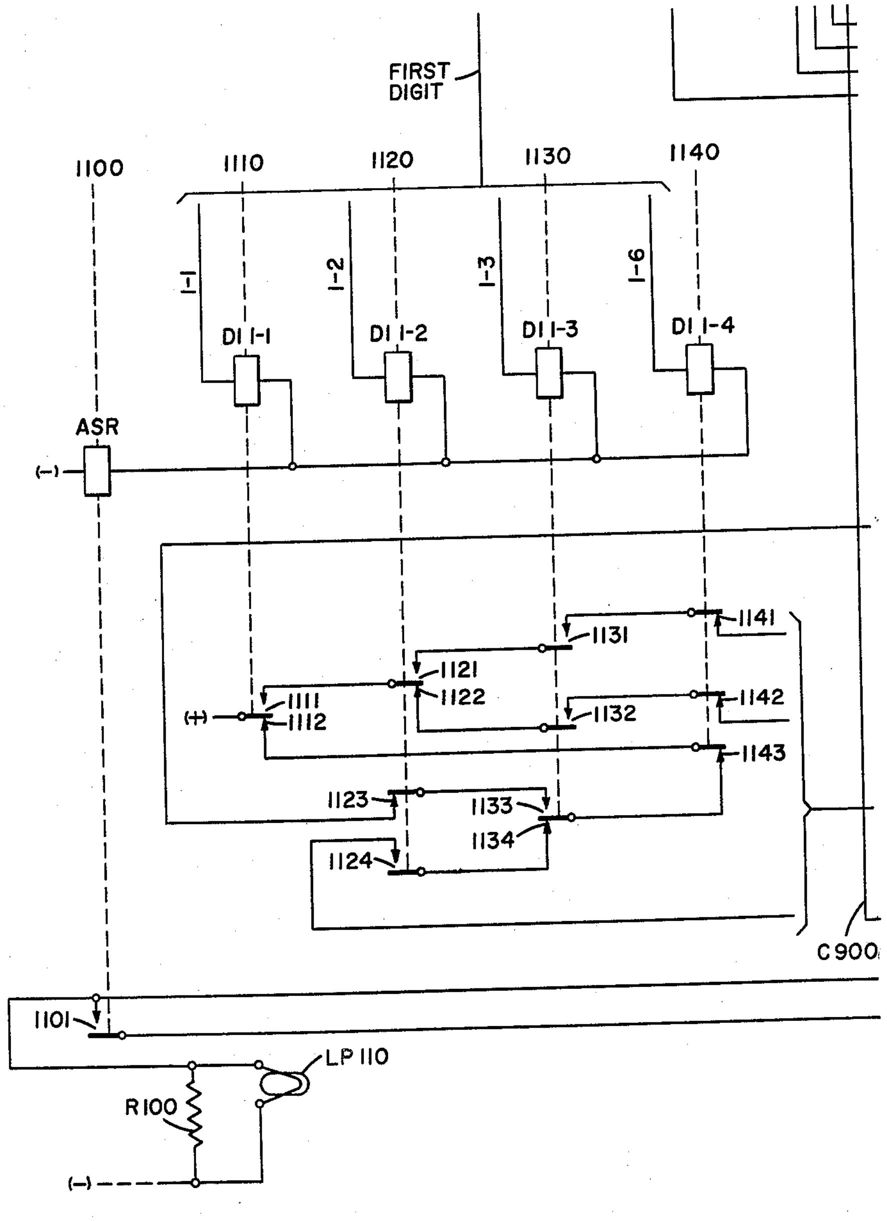
Figs. 11–13 show a schematic representation of an office code interpreter.

The operation of relay 810 is further effective at the remaining make contacts on relay 810 for connecting register A relay contacts which are effective for indicating the stored digit in register A directly into the first digit interpreter, shown in Fig. 11, over the conductors shown collectively as "1st DGT" at make contacts 819c, 819d, 819e and 819f. The operation of relay 810 is effective for connecting the contacts of the register B relays into the second digit translator circuit shown in Fig. 10a at make contacts 818, 819, 819a and 819b over conductors shown collectively as "2nd DGT." Similarly, the operation of relay 810 is effective for connecting register C digit indicating contacts into the third digit translator, shown in Fig. 10b, over conductors shown collectively as "3rd DGT" at make contacts 814, 815, 816 and 817. The effects of extending these connections is to be explained next.

OPERATION OF THE DIGIT INTERPRETER AND DIGIT TRANSLATOR

Figure 12:
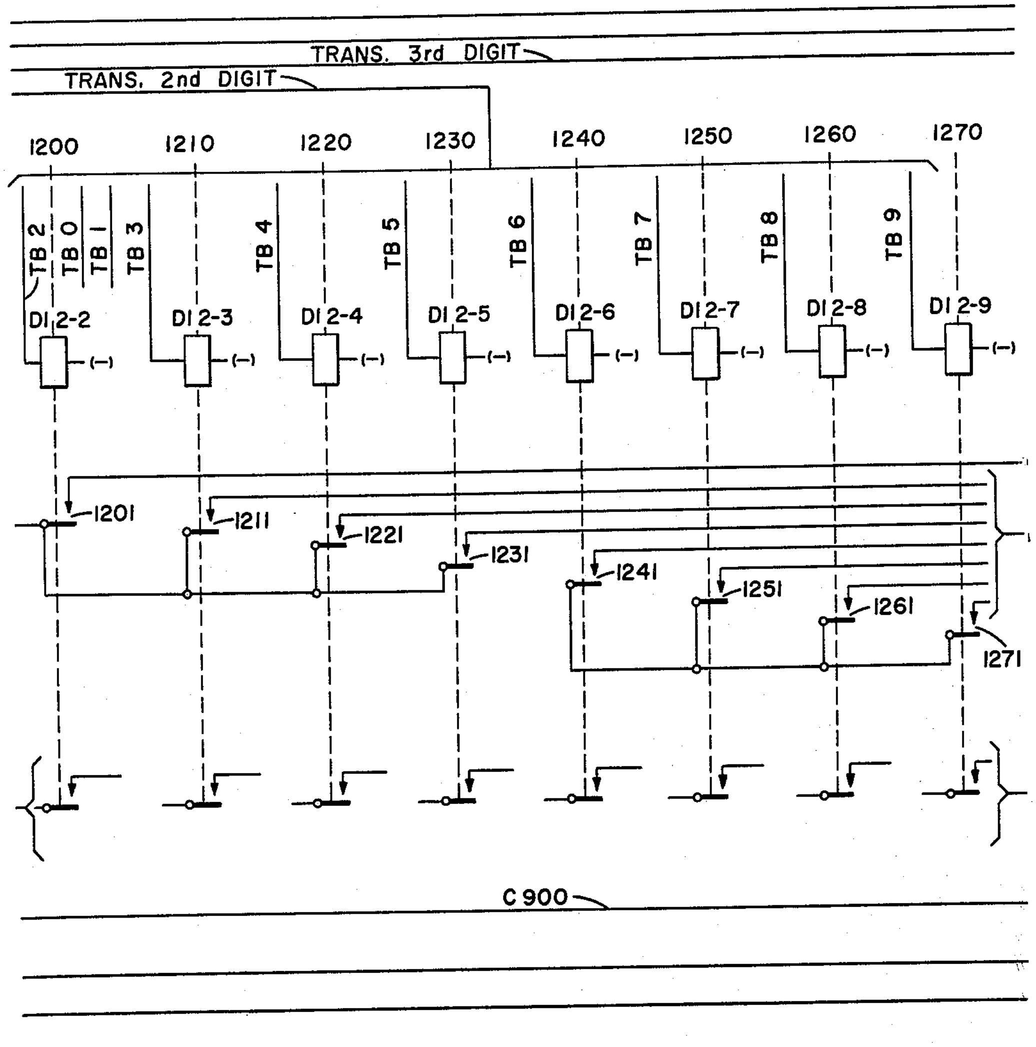

The function of the presently described digit translators, shown in Figs. 10a and 10b, is to decode the information stored within the register B and register C means and to transmit the decoded information into the second and third digit interpreters, shown in Figs. 12 and 13, respectively. Information stored in the register A means is transmitted in the previously described manner directly into the first digit interpreter means, shown in Fig. 11. In the following description it is assumed for purposes of illustration only that the group of digits transmitted over trunk line TT30 and recorded within the registering means within the trunk adapter circuit in the previously described manner is the group "328." Thus, within register A, only relay 620 is in operated condition; within register B, only relay 710 is in operated condition; and within register C, relays 510, 530 and 540 are in operated condition.

*Transferring the digit recorded within register A into the first digit interpreter.*—Each of the register A relays includes make contacts, such as 606, 616, 627 and 637, which are effective for indicating the value of the digit recorded within register A in the previously described manner. In the case chosen for discussion here, the digit "3" has been recorded within register A so that only relay 620 within register A is in operated condition. Consequently, only make contacts 627 of the digit indicating contacts within register A are closed at this time.

The closure of the digit indicating contacts within register A is effective for applying ground in various combinations corresponding to the digit recorded within register A to the first digit interpreter relays 1110, 1120, 1130 and 1140 after relay 810 has been operated in the above-described manner. In the case chosen for discussion here, the operation of relay 620 only is effective for operating only relay 1120 within the first digit interpreter. The operating circuit for relay 1120 is traced from ground through make contacts 627 and 819d, conductor 13, and the windings of relays 1130 and ASR relay 1100 to battery. Relays 1100 and 1120 thereupon operate with effects which are to be explained presently.

*Operation of the second digit translator.*—As previously indicated, the second digit translator is effective for decoding the information stored in the register B relays of the adapter circuit associated with the operated one of the lockout relays. Each relay within register B includes a set of make contacts, such as 703, 713, 723 and 733, for indicating to the second digit translator the value of the number recorded within register B. These contacts are effective for applying ground in various combinations to conductors extended from the register B into the second digit translator relays 1000, 1010, 1020 and 1030. In the case chosen for discussion here, the operation of only relay 710 within register B is effective in response to the operation of relay 810, which takes place in the previously described manner, for completing an operating circuit for relay 1010. The latter circuit is traced from ground through make contacts 713 and 819a, conductor 2—2—1 of the second digit group conductors, and the windings of relays 1010 and 1040 to battery. Relays 1010 and 1040 thereupon operate with effects that are to be explained presently.

*Operation of the second digit interpreter.*—The operation of one or more of the second digit translator relays 1000, 1010, 1030 and 1040 is effective for selectively connecting ground to one and only one of the translator B conductors which interconnect the second digit translator with the second digit interpreter and the relay to which the selectively energized conductor is connected, shown in Fig. 12. In the specific case being described here only relay 1010 in the second digit translator is operated, ground is applied to only conductor TB2 and the winding of second digit translator relay 1200. The energizing circuit is traced from ground through break contacts 1002, 1034 and 1026, make contacts 1014, conductor TB2, and the winding of relay 1200 to battery. Relay 1200 thereupon operates.

*Operation of the third digit translator and interpreter.*—Returning to the consideration of the trunk adapter circuit, the operation of register C in the previously described manner to store the third digit is effective for operating one of the digit indicating make contacts on relays 500, 510, 520 and 540, such as 505, 515, 527, and 544. The operation of one or more of the digit indicating contacts within register C is effective for energizing one or more of the corresponding third digit conductors which interconnect the register C to the third digit translator, as shown in Fig. 10*b*. Within the third digit translator, which is substantially identical to the second digit translator shown in Fig. 10*a*, one or more translating relays corresponding to the operated ones of the register C relays is energized. Thus, in the case illustrated here, the operation of register C to record the third digit "8" transmitted over trunk line TL30 in the previously described manner is effective for operating relays 510, 530 and 540 within register C. The operation of relay 510 is effective for extending ground over third digit conductor 3—2—1 from the previously described grounded conductor AMG through make contacts 515, break contacts 648 and 748, and make contacts 816 to conductor 3—2—1. Similarly, the operation of relay 540 is effective for applying ground to conductor 3—1—6 from grounded conductor AMG through make contacts 544, break contacts 644 and 744, and make contacts 814 to conductor 3—1—6. Within the third digit translator, shown in Fig. 10*b*, means similar to a folded tree contact shown on relays 1000–1030, inclusive, in Fig. 10*b*, is effective for selectively energizing one of the transfer third digit conductors and third digit interpreter relays. In the case chosen for discussion here, the registration of the digit "8" within register C and the resulting operation of the third digit translator, shown in Fig. 10*b*, is effective for energizing TC8 and the winding of relay 1340. Relay 1340 thereupon operates.

Upon the operation of the entire interpreter means (i.e., the first, second and third digit interpreters) in the above-described manner, the tree contacts shown on the first, second and third digit interpreter relays in Figs. 11, 12 and 13 are effective for selectively energizing the one of the group of terminals connected to each contact set of the third digit interpreter relays which is unique to the group of digits transmitted over trunk line TL30. Thus, in the case being considered here, transmission of the signals "328" and the resulting operation of relays 1130, 1200 and 1340 is effective for placing ground potential on terminal 328 in the cross-connecting terminal group of the third digit interpreter. The circuit is traced from ground through break contacts 1112 and 1143, make contacts 1133, break contacts 1123, make contacts 1211 and 1341 to terminal 328. The selected energization of the one of the terminal set unique to the code or group of digits transmitted over line TL30 is effective for selectively operating the actuating means shown in actuator circuit, Fig. 14, in the manner next described.

OPERATION OF THE ACTUATOR CIRCUIT

The actuator circuit is effective for selectively controlling the blocking means and the dismissing means (including relays 200 and 400, respectively) in the trunk adapter circuit from which signals to the interpreter have been transmitted. In the event that the code or group of digits transmitted over line TL30 represent the directive signals required to reach a restricted destination within the distant central office, the energization of the above described contact unique to the code is effective for causing the actuator to be operated in a first manner. On the other hand, where the transmitted group of signals represents a non-restricted central office destination, the actuating means is operated in a second manner. Accordingly, the actuator circuit is provided with first and second input conductors C1400 and C1401 suitably connected to the various terminals in the above-described set. Conductor C1400 is connected to terminals unique to restricted office codes, so that energization of conductor C1400 causes means within the actuator circuit to be selectively operated to energize "no-go" conductor C801. Similarly, conductor C1401 is connected to terminals unique to unrestricted office codes, so that energization of conductor C1401 is effective for causing the selectively operable means to energize the "go" conductor C800. The manner in which this selective operation is achieved is next explained.

Referring to the above description of the lockout circuit shown in Fig. 9*a*, energization of any one of the lockout relays has been shown to be effective for operating guard relay 900. The energization of relay 900 is effective for operating pickup relay 1400 within the actuator circuit. The latter circuit is traced from ground through make contacts 903, conductor C900, and the winding of relay 1400 to battery. The operation of relay 1400 is effective for interconnecting conductors C1400 and C801 through make contacts 1403 and 1404. The operation of relay 1400 is also effective for interconnecting conductors C800 and C1401 through make contacts 1406 and 1408.

Assuming that code "328" represents a central office destination, the connection of ground to terminal 328 in the previously described manner is effective in response to the operation of relay 1400 for extending ground to interconnected conductor 801 through make contacts 1403 and 1404. In the event that the code "328" represents an unrestricted central office destination, the application of ground to the third digit interpreter terminal 328 is effective for applying ground to conductor C800 through make contacts 1408 and 1406.

TRANSMISSION OF A "NO-GO" SIGNAL TO THE TRUNK CIRCUIT ADAPTER

The selective energization of conductors C800 and C801 is effective for controlling the previously referred to "go" and no-go" means within the trunk adapter circuit from which the signal code has been passed to the common digit interpreter in the above described manner. In the event that the group of signals transmitted over trunk line TL30 represents a restricted destination within the distant central office, the application of ground to conductor C801 is effective for operating the service restricting or blocking means including relay 200, the winding of which is connected to conductor C801 in the above described manner. The operation of relay 200 is effective for opening the connection extended from the calling station A through selector 20 and trunk termination TT30 at break contacts 203, 205 and 207. It is to be noted that the tip and ring conductors of jack J20 at operator position 20 are bridged across conductors T20 and R20, so that the calling station A may be interconnected to the telephone (not shown) at operator position OP20 at any time. The operation of relay 200 is further effective for energizing signal lamp LP20 at operator position 20 by closing a circuit from battery through make contacts 421 and 201 and lamp LP20 to ground. The energization of lamp LP20 signals the operator at position 20 that a call hase been intercepted.

The operation of relay 200 is further effective for opening the above traced operating circuit for relay 810 at break contacts 202. Relay 810 thereupon releases. The release of relay 810 is effective for disconnecting the previously described connection between the registering means in the trunk adapter circuit and the translating and digit interpreter circuit at make contacts 814–819, inclusive, and 819*a*–819*f*, inclusive. The release of relay 810 is also effective for opening the connections between "go" and "no-go" conductors C800 and C801 and the windings of relays 400 and 200, respectively. Thereafter, relays 400 and 200 are no longer operative under the control of the previously described actuating means. The release of relay 810 is further effective for removing the ground connection from thermistor R40 at make contacts 812.

Returning to the consideration of relay 200, the operation of relay 200 is effective for connecting conductors T20 and R20 to an alternate battery and ground supply for station A which replaces the battery feed previously supplied through the now disconnected winding of relay 300. The connection between conductor T20 and ground is traced from ground through break contacts 431 and make contacts 204 to conductor T20. The connection between battery and conductor R20 is traced from battery through the upper winding of relay 200, break contacts 433, and make contacts 206 to conductor R20. Thereafter current flows over the previously described connection from calling subscriber station A through selector 20 to the trunk adapter from the alternate supply in order to energize the transmitter at calling station A.

The operation of relay 200 is effective for transferring conductor SL20 from the previously described ground supply, which included make contacts 313, at break contacts 207 to a ground supply through make contacts 208. Thereafter the apparatus used for establishing a connection between the calling station and the trunk adapter including selector 20 is held under the control of the ground supplied to conductor SL20 through make contacts 208.

The operation of relay 200 is further effective for releasing the registering means by disconnecting the holding ground for the register A, register B and shunt 3 (800) relays at break contacts 209. Thus, the operated ones of the register A and register B relays and relay 800 release at this time. The release of relay 800 is effective for releasing the operated ones of the register C relays by opening the ground supply to the previously described second step operating circuits at make contacts X802. The release of relay 800 is further effective for opening the previously described operating circuit for lockout relay 920 within the lockout circuit in Fig. 9*a* at make contacts 801. The lockout relay 920 releases with effects which are to be described presently. The release of relay 800 is further effective for placing the registering means in condition to record the office code signals of connections subsequently extended over trunk line TL30 by reconnecting the impulsing contacts 411 of pulsing relay 410 to the previously described first step operating circuits of the register C relays at break contacts 805. The release of relay 800 is further effective for removing the alternate ground supply to the digit energizing contacts of relay C and to the operating circuit of lockout relay 920 at make contacts 806.

Returning to the consideration of relay 200, the operation of relay 200 is further effective for completing a locking circuit for release delay relay 420 which is traced from ground through make contacts 209*d*, break contacts 434, make contacts 423, and the winding of relay 420 to battery. Thereafter, relay 420 is held operated under the control of contacts 209*d* even though the above described original operating circuit may be opened at make contacts 412 by the release of relay 410. Similarly, a locking circuit for relay 200, completed by the operation of relay 200 and traced from ground through make contacts 412 and 209*c* and the lower winding of relay 200 to battery, is replaced with ground from the same source as did the above described locking circuit for relay 420. The operation of relay 200 is further effective for disconnecting the winding of relay 410 from the previously described connection to conductor PL at break contacts 209*e*. Relay 410 thereupon releases to open the previously described operating circuit for relay 420 at make contacts 412. The operation of relay 200 is further effective for disconnecting conductors SHB and SHF from the digit identifying contacts of the register C relays at break contacts 209*f* and the previously described operating circuits of shunt relays 640, 740 and 800 at break contacts 209*g*.

Upon the above described disconnection of conductors T20 and T21 from the windings of relay 300 by the operation of relay 200 at break contacts 203 and 205, trunk calling bridge relay 300 is released. The release of relay 300 is effective for releasing trunk line TL30 and the central office switching apparatus by opening the above described seizing short between conductors TL31 and TL32 at make contacts 301. The release of relay 300 is further effective for opening the above described operating circuit for relay 310 at make contacts 302. Relay 310 thereupon releases. The release of relay 300 is further effective for removing ground from conductor PL at make contacts 304 with effects which are to be explained presently.

The release of relay 310 is effective for opening the previously described short between conductors TL31 and TL32 of trunk line TL30 at make contacts 311. The release of relay 310 is further effective for removing ground from conductor SL21 at make contacts 313. The release of relay 310 is further effective for opening the above described prepared operating circuit for relay 320 at make contacts 312. The release of relay 310 is further effective for removing ground from conductor MG at make contacts 314.

*Answering the intercepted call.*—The operator at position OP20 responds to lighted lamp LP20, associated with jack J20, by inserting the well understood three conductor plug of a cord circuit into jack J20. It is through the tip and ring conductors of the plug that the operator position telephone is connected to incoming lines, such as the one being described here. The third or sleeve conductor of the plug is connected to battery. Upon the insertion of the plug into jack J20, a circuit is completed for operating sleeve relay 430 from battery through the third conductor of the plug, the sleeve conductor of jack J20, and the winding of relay 430 to ground. Relay 430 thereupon operates.

The operation of relay 430 is effective for disconnecting the previously described alternate current supply from the calling subscriber line station A at break contacts 431 and 433. Thereafter current for energizing the apparatus at calling station A is supplied from a battery feed relay within the operator's cord circuit.

The operation of relay 430 is further effective for closing an additional locking circuit for relay 200 from ground through make contacts 432 and 209*b* and the upper winding of relay 200 to battery. The operation of relay 430 is further effective for opening the previously described holding circuits for relays 420 and 200 at break contacts 434. Relay 420 thereupon releases. However, because the above described alternate holding circuit including the upper winding of relay 200 has been completed, relay 200 remains operated at this time.

The release of relay 420 is effective for opening the above described energizing circuit for lamp LP20 at make contacts 421. Lamp LP20 is thereupon extinguished. The release of relay 420 is further effective for further opening the above described holding circuit for the register A and register B relays and for relay 800 at make contacts 422. The release of relay 420 is further effective for disconnecting conductors SHB and conductors SHF from the previously described equipment at make contacts 425 and 426, respectively.

*The release of the digit translator shown in Figs. 10a and 10b and the digit interpreter.*—Upon the release of relay 810, the previously described connections between digit identifying contacts of register A, register B and register C relays are opened. The opening of the latter connections is effective for removing ground from the operated ones of the first digit interpreter relays, shown in Fig. 11. Similarly, the operated ones of the second and third digit translator relays are released. The release of the digit translator relays is effective for releasing the corresponding second and third digit interpreter relays in Figs. 12 and 13. The restoration of the digit interpreter relays is effective for disconnecting ground from conductors C801 by opening the previously described energizing circuits at the operated ones of the tree contacts on the digit interpreter relays.

The release of lockout relay 920 in the previously described manner is effective for releasing guard relay 900 by opening make contacts 925. Relay 900 thereupon releases. The release of relay 900 is effective for restoring the actuator circuit, shown in Fig. 14, to its normal condition by releasing relay 1400. Relay 1400 is released by opening the above described operating circuit at make contacts 903.

The lockout digit translator, digit interpreter and actuator circuits are now in normal condition. Because all relays within the lockout circuits are in normal condition, the digit interpreter and actuator are again available for translating and interpreting digits stored in the registering means of a trunk adapter circuit connected to one of the trunk terminations, such as TT30.

TRANSMISSION OF A "GO" SIGNAL TO THE TRUNK ADAPTER CIRCUIT

If the digits stored within the registering means of the trunk adapter circuit represent a central office designation which is unrestricted to private branch exchange calling line stations, ground is applied in the above described manner to conductor C800 from terminal 323 within the third digit interpreter, the terminal being connected to the conductor C1401. The application of ground to conductor C800 is effective for operating the dismissing means including relay 400 which is connected to conductor C800 at make contacts 811 in the previously described manner.

The operation of relay 400 is effective for opening the previously described operating circuit of lockout relay 920 at break contacts 404. Relay 920 thereupon releases. The operation of relay 400 is further effective for opening the previously described operating circuit for relay 410 at break contacts 405. The operation of relay 400 is further effective for disconnecting grounded conductor SHB from the digit identifying contacts of the register C relays at break contacts 406. The operated ones of the register C relays thereupon release. The operation of relay 400 is further effective for disconnecting conductor SHF from the above described operating circuits for shunt relays 640, 740 and 800 at break contacts 407. The operation of relay 400 is further effective for closing a locking circuit for itself from ground through make contacts 314, 402, and the winding of relay 400 to battery. Relay 400 is thereafter held in its operated condition under the control of relay 310, which is in turn controlled by trunk calling bridge relay 300.

The release of relay 410 and the disconnection of conductors SHB and SHF from the trunk adapter circuit is effective for rendering the registering means within the trunk adapter inoperative to further trains of directive impulses repeated by trunk calling bridge relay 300. Thus, the calling subscriber station A apparatus may thereafter transmit the required additional signals over trunk line TL30 in the above described manner to directively operate switching apparatus within the central office and thereby establish the desired connection without reoperating the registering means within the trunk adapter circuit.

Returning to the consideration of relay 410, the release of relay 410 is effective for opening the above described operating circuit of relay 420 at make contacts 412. Relay 420 thereafter releases opening the previously described holding circuits for the register A and register B relays and for the second step operating circuit for shunt relay 800 at make contacts 422. The operated relays within registers A and B and relay 800 thereupon release. At this point, the registering means within the trunk adapter is in normal condition.

Referring to the lockout relay 920, the release of relay 920 is effective for opening the above described operating circuit for relay 810 at make contacts 921. Relay 810 thereupon releases to disconnect the registering means digit identifying contacts from the digit translator circuits and the first digit interpreter circuits in the manner described in connection with the release of relay 920 at the end of transmission of a "no-go" signal to the trunk adapter circuit. Similarly, the release of relay 810 is further effective for disconnecting "go" and "no-go" conductors 800 and 801 from the windings of relays 400 and 200, respectively. The release of relay 810 is further effective for removing ground from thermistor R40 at make contacts 812.

The disconnection of the digit identifying contacts of the registering means from the digit translator and digit interpreter circuits is effective in the manner described in connection with the operation of the blocking means for restoring the digit translator and the various digit interpreter circuits to normal condition. Similarly, the release of relay 920 in the lockout circuit is effective for restoring guard relay 900 to its normal condition, thereby restoring the actuator circuit in the above described manner to its normal condition. The lockout digit translator and digit interpreter circuits are now in condition to respond to the operation of the registering means within a trunk adapter circuit associated with a trunk termination, such as TT30, in the course of the extension of calls from other calling private branch exchange stations into the distant central office.

RELEASE OF THE TRUNK ADAPTER CIRCUIT

*In the case of intercepted calls.*—Upon being informed by the operator at position OP20 that the destination dialed by the station is restricted, the user at the private branch exchange station returns the station telephone to its hookswitch. Thereafter, the removal of the plug within the operator position from jack J20 is effective for releasing the switch train between calling station A and operator position OP20 as well as the trunk termination TT30 for further use. Thus the removal of the plug from jack J30 releases sleeve relay 430 by opening the previously described operating circuit at the sleeve conductor of jack J20. The release of relay 430 is effective for opening the alternate operating circuit described above for relay 200 at make contacts 432. Relay 200 thereupon releases, restoring the connection between the incoming conductors, including T20, R20 and SL20, and conductors T21, R21 and SL21, respectively, leading to the trunk termination TT30. The release of relay 200 is further effective for removing ground from conductor SL20 at make contacts 203. Thereupon the previously held selector 20 and other switching apparatus through which the connection from calling station A was established to the trunk adapter is restored to normal. Similarly, the release of relay 200 is effective for reconnecting conductor PL to the winding of relay 410 and conductors SHB and SHF to the previously described apparatus within the trunk adapter circuit.

Trunk termination TT30 and the connected trunk adapter circuit, shown in Figs. 2*b* and 4–8, are now in idle condition and ready for service in the course of extending calls from other private branch exchange stations to the central office.

*In the case of non-intercepted calls.*—At the conclusion of a call from a station such as A to the central office exchange, the telephone at the calling station is returned to its hookswitch, thereby opening the previously described operating circuit for relay 300. Relay 300 thereupon releases. The release of relay 300 is effective for opening the previously described short between conductors TL31 and TL32 of trunk line TL30 at make contacts 301. Thereupon, the central office apparatus is released in any one of a number of manners well understood by those skilled in the telephone art. The release of relay 300 is further effective for removing ground from conductor PL at make contacts 304. The release of relay 300 is further effective for opening the previously described operating circuit for relay 310 at make contacts 302. Relay 310 thereafter releases.

The release of relay 310 is effective for further opening the previously described short between conductors TL31 and TL32 at make contacts 311. The release of relay 310 is further effective for opening the prepared circuit for operating relay 320 at make contacts 312. The release of relay 310 is further effective for removing ground from conductor MG at make contacts 314. The release of relay 310 is further effective for removing ground from the incoming sleeve conductors SL20 and SL21 at make contacts 313. The removal of ground from conductors SL20 and SL21 is effective for releasing the previously described apparatus including selector 20 used for establishing a connection between the calling station and trunk termination TT30.

The removal of ground from conductor MG is effective for opening the previously described locking circuit for relay 400. Relay 400 thereafter releases. The release of relay 400 is effective for repreparing the previously described operating circuit for lockout relay 920 at break contacts 409. Similarly, the release of relay 400 is effective for preparing the above described operating circuit for relay 410 at break contacts 405. Similarly, the release of relay 400 is effective for recompleting the previously described connection between conductors SHB and AMG at break contacts 406. The release of relay 400 is further effective for re-establishing the connection between conductors SHF and the previously described energizing circuit for shunt relays 640, 740 and 800 at break contacts 407.

At this point, both trunk termination TT30 and its connected adapter circuit are in normal condition. Thereafter the termination may be reseized by the same or other stations within the private branch exchange in order to extend calls into the central office.

RESTRICTING SERVICE TO DESTINATIONS CHARACTERIZED BY LESS THAN THE NUMBER OF DIGITS IN A FULL OFFICE CODE

Thus far, the service restricting and adapter dismissing operations after the transmission of a full office code comprising three digits has been described. Within the telephone system contemplated, it may also be necessary to restrict connections extended from stations such as A within the private branch exchange to certain central office destinations characterized by less than the full number of digits in an office code. I accomplish this by causing the service restricting means within the adapter circuit to operate directly upon the registration of certain digits within the register A in order to block connections extended to destinations within the central office characterized by a single digit. This direct operation of the restricting means within the adapter circuit saves the necessity for seizing the common translator and actuator circuits and for operating the lockout means. Similarly, the register B is arranged to operate the restricting means within the adapter circuit at the conclusion of the transmission of a second office digit which characterizes a restricted destination within the central office for the same seasons. The method by which this direct operation of the restricting means is brought about is next explained in detail.

*Restriction after the transmission of a first digit.*—The connection from a calling station, such as A, within the private branch exchange is extended to trunk termination TT30, trunk termination TT30 is seized and the first digit of the central office destination code is transmitted from the dial of the calling station over trunk line TL30 in the manner previously described in connection with the transmission of a three digit office code. Similarly, the register C relays operate in the previously described manner to translate the number of impulses transmitted over trunk line TL30 into a unique operated combination of the register C relays. Thereafter the operated condition of shunt 1 relay 640 is effective in response to the application of ground to conductor SHB for transferring the combination stored within register C into the corresponding relays of register A.

Assume that the user of the calling station A in an effort to nullify the effects of the service restricting feature previously described transmits a digit such as "1" as the first office code digit with the knowledge that the central office apparatus is arranged to absorb all such digits. In response to the operation of the register A relays in the unique combination corresponding to the restricted first digit, a circuit is completed for thereupon operating the service restricting relay 200. Thus, in the case chosen for consideration here, with the register A only relay 600 is operated (indicating the storage of the digit "1"), the circuit is traced from ground through break contacts 209, make contacts 422 and 605, break contacts 615, 626 and 636, and the lower winding of relay 200 to battery. Relay 200 thereupon operates with the previously noted effect of causing the trunk line TL30 to be released and for signaling the operator position OP20 by lighting LP20. Thereafter, the call proceeds as in the case of calls restricted after the transmission of a three digit office code.

*Restriction of service following the transmission of a second digit.*—In the event that the first digit transmitted from the calling subscriber station A over trunk line TL30 does not of itself represent a restricted service destination within the central office, but is followed by a second digit indicating such a restricted destination, the first and second digits are repeated in the manner previously described in connection with the transmission of a three digit office code to the central office to operate register C relays a first and second time and to transfer the operated combination of the register C relays to the register A and register B relays in order to store the first and second transmitted digits. In the event that the second registered digit represents a central office destination restricted to private branch exchange stations such as A, the operation of the register B relays to store the restricted digit is effective for completing a circuit for operating the restricted service relay 200. In the case chosen for discussion here, it is assumed that the restricted second digit is "1". Thus, in the previously described manner, only relay 700 within register B is operated in response to the storage of the digit "1" within register B. The operation of only relay 700 within register B is effective for completing an energizing circuit for relay 200 which is traced from ground through break contacts 209, make contacts 422 and 706, break contacts 716, 727 and 737, and the lower winding of relay 200 to battery. Relay 200 thereupon operates with the previously noted effects of releasing trunk line TL30, bringing in a signal in front of the operator at position OP20, and releasing the operated ones of the register relays.

From the point at which restricting relay 200 is operated, the call proceeds in the manner described in connection with the interception of a call following the transmission of a full three digit office code over trunk line TL30.

ALARM APPARATUS

Because the previously described digit translator, digit interpreter and actuator circuits are common to a group of trunk terminations and their trunk adapter circuits, and the common apparatus is arranged to be used by only one trunk termination and adapter circuit at a time, a failure of the common equipment during the translation and interpreting process of a particular digit set stored within one of the adapter circuits prevents the above described apparatus from carrying out its proper discriminating function in calls outgoing over the trunk lines to the central office. Therefore, it is necessary to indicate such failures or alarm conditions in order that the condition may be cleared as rapidly as possible. Among other safeguards, the apparatus embodying my invention is further arranged so that upon the registration of a complete office code within a particular trunk adapter, failure of the actuator circuit to transmit in the previously described manner either a "go" or a "no-go" signal to the trunk adapter results in an automatic interception of the call. In this way, if the apparatus causing the failure lies within the individual trunk circuit, the trunk termination and its adapter are cleared from connection to the common apparatus so that the next succeeding call extended over one of the central office trunk lines may use the common apparatus in the previously described manner.

While the alarm apparatus described in the following paragraphs is confined solely to visual lamps, it is to be understood that I intend to include within the meaning of the words "alarm apparatus" all such devices as audible and visual alarm signaling equipment as well as devices for relaying alarm condition signals to remote points.

*Automatic interception.*—In case of failure of the common apparatus including the actuator circuit to transmit to an individual trunk adapter circuit either a "go" or "no go" signal after a complete operation of the registers A, B and C has been effected and relay 810 has been operated in order to interconnect the outputs of the various registers to the translator and interpreter circuits, the operation of relay 810 is effective in the previously described manner to apply ground through a delay device comprising thermistor R40 to the upper winding of relay 200 at make contacts 812. In the event that the previously described actuator circuit fails to selectively energize the operating circuits of service restricting relay 200 or cut-through relay 400 within the time required for the application of 48 volts across thermistor R40 to reduce the resistance of R40, the reduction of resistance within thermistor R40, allows enough current to flow from ground through make contacts 812, thermistor R40, and the lower winding of relay 200 to operate relay 200. Thermistor R40 is chosen so that the delay introduced in the operation of relay 200 over the circuit including R40 is greater than the time in which the common equipment can be resasonably expected to operate. The operation of relay 200 is effective in the previously described manner to operate signal lamp LP50 in position OP20 in order to indicate the presence of an intercepted call to the operator at position OP20 and to release the registers A, B and C as well as the common equipment including the digit translators and selectors. The latter is accomplished as previously described by opening the operating circuit for relay 810 at break contacts 202.

*Failure of the lockout circuit relays to release.*—In the event that the lockout relay, such as 920, individual to a trunk adapter circuit fails to release at the end of a transmission of the "go" or "no go" signal to a trunk adapter from the actuator circuit in the previously described manner, the following described apparatus is effective for indicating such a condition. I have provided an alarm common relay 960 normally operated in series with the previously described battery source. The circuit is traced from ground through the winding of relay 960, break contacts 944, 942 and 902, the series cutoff contacts such as 945, 934, 924 and 914 on the lockout relays, and ballast lamp LP40 to battery. Following the operation of any one of the lockout relays, the above traced operating circuit for relay 960 is opened at the one of the series cutoff contacts associated with the particular lockout relay.

The release of relay 960 is effective for applying ground to the start conductor of well understood interrupter means such as interrupter 900. Thereafter, interrupter 900 is effective for transmitting ground impulse signals at a predetermined rate, such as 10 impulses per minute, over conductor 10IPM to the alarm circuit shown in Fig. 9*b*. The release of relay 960 is effective for connecting conductor 10IPM to the lower winding of relay 970 through make contacts 973 and break contacts 963. Thereafter, upon the appearance of a ground signal on conductor 10IPM, current flows through the lower winding of two-step relay 960 to operate that relay sufficiently to close preliminary make contacts X961.

The operation of relay 960 through its first step is effective for preparing a second step operating circuit for itself from battery through the lower and upper windings of relay 960, make contacts X961 and now closed break contacts 972 to ground. Upon the removal of the ground signal from conductor 10IPM, the above traced second step operating circuit for relay 960 becomes effective to operate that relay through its second step.

The operation of relay 960 through its second step is effective for closing the connection between conductor 10IPM and the winding of relay 950 through now closed break contacts 973, make contacts 962, break contacts 952, and the winding of relay 950 to battery. Upon the appearance of the next successive ground signal on conductor 10IPM, relay 950 operates and closes a locking circuit for itself from ground through now closed break contacts 972, make contacts 953, and the winding of relay 950 to battery. The operation of relay 950 is further effective for connecting battery to an obvious energizing circuit for alarm lamp LP91 at make contacts 951.

If the lockout relay which failed to release during the transmission of two successive impulses over conductor 10IPM thereafter is released, the above traced energizing circuit for relay 970 is re-established. The resulting reoperation of relay 970 is effective for stopping interrupter 900, opening the locking circuit of relays 950 and 960 at break contacts 972, and for opening the first step energizing circuit for relay 950 and the operating circuit for relay 950 at break contacts 973. Relays 950 and 960 thereupon release. The release of relay 950 is effective for opening the energizing circuit of lamp LP91 to de-energize the latter lamp. The alarm A circuit shown in Fig. 9*b* is now in normal condition and extinguishing lamp LP91 indicates that the lockout circuit has returned to its normal condition and is ready for further use.

*Failure of a lockout relay to operate.*—In the event that the lockout relay in the circuit shown in Fig. 9*a* such as 920 individual to the trunk adapter circuit shown in Figs. 2*b* and 4–8 fails to operate in the above described manner after the full office code has been registered within registers A, B, and C, the fact is indicated by the failure of relay 900 to operate in the previously described manner. Failure of relay 900 to operate or the failure to transmit ground over conductor C900 results in the failure of actuator circuit shown in Fig. 14 to transmit either a "go" or a "no go" signal. In order to indicate this condition, I provide alarm relay 1410 to be operative in response to the application of ground through the digit interpreter terminals to either conductor C1400 or C1401.

The circuit is traced from ground through the previously described tree contacts on the digit interpreter, either conductor C1400 and break contacts 1402 or conductor 1401 and break contacts 1409 through the winding of relay 1410 to battery. The operation of relay 1410 is effective in response to the released condition of relay 1400 for energizing alarm lamp LP110 from ground through break contacts 1401, make contacts 1411 and LP110 to battery.

*Failure of the common equipment to release.*—In the event that the common lockout circuit (Fig. 9*a*), translators (Figs. 10*a* and 10*b*), and interpreter fail to release as indicated by the continued operation of guard relay 900 and the operated condition of the digit translator alarm relay such as 1040 and the alarm supervisory relay 1100, energizing circuits for alarm indicating lamps are completed. Thus, in the case of the digit translators, the alarm lamp associated with the particular unreleased translator is energized from battery through the alarm lamp such as LP100 through make contacts 1041 and 903 on still-operated relays 1040 and 900. In the case of the failure to release of the first digit interpreter, the circuit for energizing alarm lamp LP110 is traced from battery through lamp LP110, make contacts 1101 on still-operated relay 1100 and break contacts 1401 to ground.

SUMMARY

In the foregoing description, I have described how in a private branch exchange system calls may be extended from private branch exchange stations through the switching equipment of the private branch exchange to trunk terminations and thence to the central office. The description includes the operation of a trunk adapter individual to each such trunk termination. I have shown how the restricted service apparatus within each trunk adapter circuit is effective in response to the registration of an office code or single digit for preventing the extension of calls from private branch exchange stations to certain central office destinations. Similarly, the description covers the operation of the dismissing or cut-through means which is effective upon the registration of a non-restricted central office destination code for dismissing the registering means within the trunk adapter.

The description has related the operation of the registering means within the trunk adapter circuit. It has been pointed out how the registers A, B, and C, which are effective for recording first, second and third digits transmitted as an office code from the calling private branch exchange station over the central office trunk line are operated. It has further been pointed out how the last used register C is first employed as a means for translating the number of digits within an impulse train into a unique operated combination of relays and how that combination is transferred from the register C relays into first the register A and thereafter into the register B. The description has proceeded to show how the register C is thereafter used to record the value of the last translated digit of the office code impulses.

I have shown how upon the registration of a complete code of digits within the registers A, B, and C of one of the trunk adapter circuits, the common lockout apparatus is effective for extending connections between the registers B and C and the second and third digit translators in order to transfer the unique combinations of register relays within the last named registers. I have further shown how the operation of the lockout circuit is effective for interconnecting the register A relays directly into the first digit interpreter which is also common to the group of trunk adapter circuits. The description has pointed out how upon the transfer of information into the second and third digit translators, the information is decoded and further transmitted into the second and third digit interpreters, respectively.

The description has demonstrated how the first, second, and third digit translators are operated in response to the transmission of information from the preceding circuits for energizing one of a set of terminals individual to each possible combination of office code signals which may be transmitted from the calling private branch exchange station. It has been demonstrated how, by cross-connecting certain ones of the terminals representing unrestricted destinations within the central office, actuator means also common to the group of trunk adapter circuits is selectively operated in a first particular manner, and how other cross-connecting means connected to other terminals representing restricted central office desinations is effective for selectively energizing the actuator means in a second particular manner. I have shown how the operation of the actuator means in the above referred to first manner is effective for actuating the dismissing or cut-through means individual to the trunk adapter circuit in which the digit interpreted has been stored or registered. Similarly, the description shows how the operation of the actuator means in the second particular manner is effective for operating the service restricting means within the same trunk adapter.

The description also sets forth the manner of operation of the restricting means under the control of the register A and register B in the event that the first or second transmitted digit from the calling private branch exchange station of itself represents a restricted central office destination without the necessity for calling in the common lockout digit translator and digit interpreter apparatus.

The description has set forth alarm features of the apparatus forming the preferred embodiment of my invention. Thus, it has been shown how in the event that the actuator means is not selectively operated within a predetermined time interval, the restricting service means within a trunk adapter is operated in order to intercept a call at the operator position within the private branch exchange and to dismiss the registering means within the trunk adapter. Similarly, it has been shown how the failure of one of the lockout relays in the lockout circuit to release within a predetermined time interval is effective for bringing in an alarm signal. In connection with the lockout alarm apparatus, it has further been shown how if the alarm condition clears itself, the alarm apparatus is restored to its normal condition. Other alarm apparatus associated with the digit translator is effective for indicating the alarm condition existing when the lockout circuit fails to release and the digit translator fails to be cleared from the trunk adapter in the manner described. Similar alarm apparatus in the directly operated first digit interpreter is described.

Other alarm apparatus associated with the actuator circuit is described as being operative in the event that the primary energizing means associated with the actuator circuit fails to operate and interconnect the cable connecting the individual terminals of the digit translator apparatus to either of the "go" or "no go" conductors which extend to the individual trunk adapter circuit and which are effective for selectively energizing the service restricting and cut-through means.

While I have shown and described in the foregoing description the preferred embodiment of my invention, other modifications of my apparatus will occur to those skilled in the art. I, therefore, aim in the appended claims to cover all such modifications as fall within the true spirit and scope of my invention.

What is claimed is:

1. In a telephone system including a plurality of trunk circuits and a corresponding plurality of trunk lines, each trunk line being individually extended to one of said circuits, means for seizing and thereafter transmitting directive signals to any one of said circuits, and wherein each of said circuits includes means for repeating over a corresponding one of said lines directive signals transmitted thereto, the combination comprising: means individual to each of said circuits for registering the value of each of a group of directive signals transmitted over the corresponding one of said trunk lines, means individual to each of said circuits for blocking connections extended over the corresponding one of said trunk lines, actuating means common to said plurality of circuits and trunk lines for operating any one of said blocking means, interpreting means common to said plurality of circuits and said lines for controlling said actuating means, interconnecting means individual to each of said circuits for connecting the corresponding one of said registers to said common interpreting means, lockout means common to said plurality of circuits and said lines responsive to the registration of a group of directive signals in any one of said registering means for operating the one of said interconnecting means corresponding to the operated one of said registering means, said interpreting means being operative in one of a number of unique manners corresponding to the particular combinaton of signals registered within the operated one of said registering means, said interpreting means operated in certain ones of said unique manners being effective to cause said actuating means to operate the one of said blocking means individual to the one of said circuits corresponding to the operated one of said registering means, whereby a connection extended over any one of said trunk lines and characterized by any one of a plurality of groups of signals characterizing a restricted destination is blocked.

2. The system set forth in claim 1 wherein said blocking means is also operative for making a corresponding one of said registering means inoperative with respect to directive signals transmitted to the corresponding ones of said circuits after the operating of said blocking means.

3. In a telephone system including a plurality of trunk circuits, a plurality of trunk lines, each of said trunk lines extending to one of said circuits, and means for seizing any one of said circuits and thereafter transmitting directive signals to the idle one of said circuits, and wherein each of said circuits includes means for repeating over the corresponding one of said lines directive signals transmitted thereto, the combination comprising: means individual to each of said circuits for registering the value of each one of a group of directive signals transmitted over the corresponding one of said trunk lines, cut-through means individual to each of said circuits for rendering the corresponding one of said registering means inoperative, means common to said plurality of circuits and said lines for actuating any one of said cut-through means, interpreting means common to said pluralities of lines and circuits for controlling said actuating means, interconnecting means for connecting any one of said registering means to said interpreting means, lockout means common to said plurality of circuits and said trunk lines operative in response to the registration of a group of directive signals in any one of said registering means for operating the corresponding one of said interconnecting means, said interpreting means being operative in one of a number of unique manners which corresponds to the particular combination of signals registered within the operated one of said registering means, said interpreting means operated in certain ones of said unique manners being effective to cause said actuating means to operate said cut-through means individual to the one of said circuits corresponding to the operated one of said registering means, whereby a connection may be established over the corresponding one of said lines characterized by any one of the plurality of groups of signal characterizing an unrestricted destination.

4. In a telephone system including a plurality of trunk circuits, a plurality of trunk lines, each of said trunk lines extending to one of said trunk circuits, and means for seizing any one of said trunk circuits and thereafter transmitting directive signals to any one of said circuits, and wherein each of said circuits includes means for repeating over to the corresponding one of said lines directive signals transmitted thereto, the combination comprising: means individual to each of said circuits for registering the value of each one of a group of directive signals transmitted over the corresponding one of said trunk lines, means individual to each of said circuits for blocking connections over the corresponding one of said trunk lines, cut-through means individual to each of said circuits for rendering the corresponding one of said registering means inoperative, means common to said plurality of circuits and said lines for selectively actuating either said cut-through means or said blocking means of any one of said circuits, interpreting means common to said plurality of lines in series for controlling said actuating means, interconnecting means for connecting any one of said registering means to said interpreting means, lockout means common to said plurality of circuits and said trunk lines operative in response to the registration of a group of directive signals to any one of said registering means for operating a corresponding one of said interconnecting means, said interpreting means being operative in one of a number of unique manners which corresponds to a particular combination of signals registered within the operative one of said registering means, said interpreting means operated in certain ones of said unique manners being effective to cause said actuating means to operate said cut-through means individual to the one of said circuits corresponding to the operated one of said registering means and operated in other certain ones of said unique manners effective to cause said actuating means to operate said blocking means individual to the one of said circuits corresponding to the operated one of said registering means, whereby a connection may be established or blocked over the corresponding one of said lines characterized by any one of a plurality of groups of signals characterizing an unrestricted or restricted designation registered within the corresponding one of said registering means.

5. The system set forth in claim 4 wherein each of said blocking means is operative for rendering the corresponding one of said registering means inoperative with respect to directive signals transmitted to the corresponding one of said circuits after the operation of said blocking means.

6. In a device for recording the number of impulses in each of a plurality of impulse trains, means for transmitting successive impulse trains, a plurality of registers including first, intermediate and last for indicating the number of impulses in each of first, intermediate and last impulse trains, respectively, transmitted from said impulsing means, each of said registers having a normal condition and a plurality of unique operated conditions where each operated condition corresponds to a particular number of impulses in the train recorded therein, said last register being controlled directly by said impulsing means, first and intermediate transfer means individual to said first and said intermediate registers, respectively, each of said transfer means having a normal condition and being operative upon the transmission of only the corresponding impulse train from said impulsing means for causing the corresponding one of said registers to assume the one of the unique conditions to which said last register has been operated, each of said transfer means in operated condition being further effective for making said register responsive to the operation of said impulsing means in order to make said last register respond to first and intermediate digits and restore said last register to normal condition upon the transfer of information to said first and second registers, and other means operative in response to the last operation of said impulsing means for making said last register operative in order to record the number of impulses in the last train transmitted from said impulsing means.

7. A device set forth in claim 6 wherein each of said first and said intermediate registers in its normal condition is effective for preparing a corresponding one of said transfer means for operation.

8. A device set forth in claim 6 wherein each of said first and said intermediate registers in any one of its operated conditions is effective for preparing a one of said transfer means individual to the next succeeding one of said registers for operation.

9. A device set forth in claim 6 and having in addition means operative in response to the operation of said impulsing means for operating said first and said intermediate transfer means upon the transmission of first and intermediate impulse trains.

10. The device set forth in claim 6 wherein each of said first and said intermediate registers in its normal condition is effective for preparing the corresponding one of said transfer means for operation and is further effective in any one of its operated conditions for preparing the one of said transfer means individual to the next succeeding one of said registers for operation, and having in addition means operative in response to the operation of said impulsing means for operating the prepared one of said transfer means, whereby said first and said intermediate registers are operated in numerical order in which said first and said intermediate impulse trains are received.

11. In a telephone system including a trunk circuit, a trunk line extending from said circuit, and means for seizing and thereafter transmitting directive signals to said circuit, and wherein said circuit includes means for repeating over said line directive signals transmitted thereto, the combination comprising: registering means operated in response to successive first, intermediate and last operations of said impulse repeating means for registering the value of first, intermediate and last directive signals transmitted over said line, means for blocking connections extended over said trunk line, means for actuating said blocking means, interpreter means for controlling said actuating means, interconnecting means responsive to said registering means operated to register first, intermediate and last signals for making said registering means operate said interpreting means in one of a number of unique manners corresponding to the unique combination of signals stored within said registering means, said interpreting means in certain ones of said operated conditions being effective for causing said actuating means to operate said blocking means, said registering means also being operative in response to the registration of directive signals of certain predetermined values for operating said blocking means, whereby a connection characterized by any one of a plurality of groups of a particular number of signals representing a restricted destination is blocked upon the operation of said actuating means, and a connection characterized by any one of certain individual signals representing a restricted destination is blocked without the necessity of operating said actuating means.

12. The system set forth in claim 11 wherein said blocking means in operated condition is effective for rendering said registering means ineffective to record the value of directive signals thereafter transmitted to said circuit.

13. In a telephone system including a trunk circuit, a trunk line extending from said circuit, and means for thereafter transmitting directive signals to said circuit, and wherein said circuit includes means for repeating over said line directive signals transmitted thereto, a combination comprising: registering means operated in response to successive first, intermediate and last operations of said impulse repeating means for registering the value of said first, intermediate and last directive signals transmitted over said line, means for blocking connections extended over said trunk line, cut-through means for making said registering means inoperative, actuating means for selectively operating either said blocking means or said cut-through means, interpreter means for controlling said actuating means, interconnecting means repsonsive to said registering means operated to register first, intermediate and last signals for making said registering means operate said interconnecting means in any one of a number of unique manners corresponding to the unique combination of signals stored within said registering means, said interpreting means in certain ones of said operated conditions being effective for causing said actuating means to operate said cut-through means and in certain other ones of said operated conditions being effective for causing said actuating means to operate said blocking means, said registering means also being operative in response to the registration of individual directive signals of certain predetermined values for operating said blocking means, whereby a connection characterized by any one of a first plurality of groups of a particular number of signals representing a restricted destination is blocked upon the operation of said actuating means, a connection characterized by any one of a second plurality of groups of a particular number of signals representing an unrestricted destination may be established over said line, and a connection characterized by any one of certain individual signals representing a restricted destination is blocked without the necessity of operating said actuating means.

14. The system set forth in claim 13 wherein said blocking means in operated condition is effective for rendering said registering means ineffective to record the value of directive signals thereafter transmitted to said circuit.

15. In a telephone system including a plurality of trunk circuits, a corresponding plurality of trunk lines, each of said trunk lines individually extending from the corresponding one of said circuits, and means for seizing and thereafter transmitting directive signals to any one of said circuits, wherein each of said circuits includes means for repeating over the individual one of said lines directive signals transmitted thereto, the combination comprising: means individual to each of said circuits for registering the value of each of one of a group of directive signals transmitted over the individual one of said trunk lines, means individual to each of said circuits for blocking connections over the corresponding one of said trunk lines, actuating means common to said plurality of said circuits for controlling any one of said blocking means, interpreting means common to said plurality of circuits for controlling said actuating means, interconnecting means individual to each of said circuits for making the corresponding one of said registering means effective for operating said interpreting means to one of a plurality of unique operated conditions corresponding to the unique combination of signals stored within said registering means, said interpreting means in certain ones of its operated conditions being effective for causing said actuating means to operate the one of said blocking means individual to the operated one of said registering means, lockout means individual to each of said circuits operative in response to the operation of the corresponding one of said registering means for operating the corresponding one of said registering means and for rendering all other of said lockout means inoperative, and means operative in response to the operation of said interconnecting means and effective a predetermined time interval following the operation of said interconnecting means for operating said blocking means, said blocking means being further operative for releasing said registering means, whereby said blocking means is operated within the predetermined time interval following the operation of said interconnecting means upon the failure of the common apparatus to operate said blocking means and the common apparatus is thereupon freed for further use.

16. The system set forth in claim 15 and having in addition cut-through means individual to each of said circuits, and said interpreting means in certain other ones of its operated condition is effective for causing said actuating means to operate one of said cut-through means individual to the operative one of said registering means.

17. In a telephone system including a plurality of trunk circuits, a plurality of trunk lines, each of said trunk lines extending individually to one of said circuits, and means for seizing and thereafter transmitting directive signals to any one of said circuits, wherein each of said circuits includes means for repeating over the individual one of said lines directive signals transmitted to the corresponding one of said circuits, the combination comprising: means individual to each of said circuits for registering the value of each one of a group of directive signals transmitted over the individual one of said trunk lines, means individual to each of said circuits for blocking connections extended over the individual one of said trunk lines, means common to said plurality of circuits for actuating said blocking means, interpreting means common to said plurality of circuits for controlling said actuating means, interconnecting means individual to each of said circuits for making the corresponding one of said registering means effective to operate said interpreting means, lockout means individual to each of said circuits having a normal condition and operative in response to the registration of a group of signals within the corresponding one of said registering means for operating the corresponding one of said interconnecting means and for making the other of said lockout means inoperative, each of said blocking means being operative for restoring the corresponding one of said interconnecting means to normal condition, alarm means common to said lockout means operated in response to the operation of any one of said lockout means effective for indicating the failure of any one of said interconnecting and said lockout means to restore to its normal condition within a predetermined time interval, whereby an alarm condition is indicated following the operation of the registering means within any one of said circuits upon the failure of the corresponding one of the lockout means to restore to normal after more than a reasonable time interval for the operation of the actuating means has elapsed.

18. In a telephone system including a plurality of trunk circuits, a plurality of trunk lines, each of said trunk lines extending individually to one of said circuits, and means for seizing and thereafter transmitting directive signals to any one of said circuits, wherein each of said circuits includes means for repeating over the individual one of said lines directive signals transmitted to the corresponding one of said circuits, a combination comprising: means individual to each of said circuits for registering the value of each one of a group of directive signals transmitted over the individual one of said trunk lines, means individual to each of said circuits for blocking connections extended over the individual one of said trunk lines, cut-through means individual to each of said circuits for rendering the corresponding one of said registering means inoperative, means common to said plurality of circuits for selectively controlling either said blocking means or said cut-through means individual to any one of said circuits, interpreting means common to said plurality of circuits for controlling said actuating means, interconnecting means individual to each of said circuits for making the corresponding one of said registering means effective to operate said interpreting means, lockout means individual to each of said circuits having a normal condition and operative in response to the registration of a group of signals within a corresponding one of said registering means for operating the corresponding one of said interconnecting means and for making the others of said lockout means inoperative, each of said blocking means being operative for restoring the corresponding one of said interconnecting means to normal condition, each of said cut-through means being operative for restoring a corresponding one of said lockout means to normal condition, alarm means common to said lockout means operated in response to the operation of any one of said lockout means effective for indicating the failure of any one of said interconnecting and lockout means to restore to its normal condition within a predetermined time interval, whereby an alarm condition is indicated following the operation of the registering means within any one of said circuits upon the failure of the corresponding one of said lockout and interconnecting means to restore to normal after more than a reasonable time interval for the operation of the actuating means has elapsed.

19. In a telephone system including a plurality of trunk circuits, a plurality of trunk lines, each of said trunk lines being individual and extending from one of said circuits, and means for seizing and thereafter transmitting directive signals to any one of said circuits, and wherein each of said circuits includes means for repeating over the corresponding one of said lines directive signals transmitted to the individual circuit, the combination comprising: means individual to each of said circuits for registering the value of each one of a group of directive signals transmitted over the corresponding one of said trunk lines, means individual to each of said circuits for blocking connections extended over the corresponding one of said trunk lines, cut-through means individual to each of said circuits, actuating means common to said plurality of circuits selectively controlling said blocking means and said cut-through means of any one of said circuits, interpreting means common to said plurality of circuits for controlling said actuating means, lockout and interconnecting means individual to each of said circuits operative in response to the registration of a group of directive signals in said registering means for making the corresponding one of said registering means effective to operate said interpreting means, said interpreting means operated in any one of a first number of unique manners being operative for causing said actuating means to operate the one of said blocking means corresponding to the operated one of said interconnecting means and operated in any one of a second number of unique manners for causing said actuating means to operate the one of said blocking means corresponding to the operated one of said interconnecting means, means common to said interconnecting means operative in response to the operation of any one of said interconnecting means for rendering said actuating means effective, and alarm means operative in response to the operation of said interpreting means and to the normal condition of said actuating means for indicating the failure to operate of said actuating means.

20. In a telephone system including a trunk circuit, a trunk line extending from said trunk circuit, and means for seizing and thereafter transmitting directive signals to said circuit, wherein said circuit includes means for repeating over said line directive signals transmitted to said circuit, the combination comprising: means for registering the value of each one of a group of directive signals transmitted over said trunk line, means for blocking connections extended over said trunk line, means for actuating said blocking means, interpreting means for controlling said actuating means, interconnecting means responsive to the registration of a group of directive signals in said registering means for making said registering means effective to operate said interpreting means in one of a number of unique manners which corresponds to the particular combination of signals registered within said registering means, said interpreting means operated in certain ones of said unique manners being effective to cause said actuating means to operate said blocking means, and wherein said blocking means is also operative for making said registering means inoperative to register the value of directive signals transmitted to said circuit after the operation of said blocking means, whereby a connection to be established over said line characterized by any one of the plurality of groups of signals representing a restricted destination is blocked.

21. In a telephone system including a trunk circuit, a trunk line extending from said trunk circuit, and means for seizing and thereafter transmitting directive signals to said circuit, wherein said circuit includes means for repeating over said line directive signals transmitted to said circuit, the combination comprising: means for registering the value of each one of a group of directive signals transmitted over said line, means for blocking connections extended over said trunk line, cut-through means for making said registering means inoperative, actuating means for selectively operating either said blocking means or said cut-through means, interpreting means for controlling said actuating means, interconnecting means responsive to the registration of a group of directive signals in said registering means for making said registering means effective to operate said interpreting means, said interpreting means being operative in one of a number of unique manners which corresponds to the particular combination of signals registered within said registering means, said registering means operated in certain ones of said unique manners being effective to cause said actuating means to operate said blocking means, said interpreting means operated in certain other ones of said unique manners being effective to cause said actuating means to operate said cut-through means, and wherein said blocking means is also operative for making said registering means inoperative with respect to directive signals transmitted to said circuit after the operation of said blocking means, whereby a connection characterized by any one of the plurality of groups of signals representing a restricted destination to be established over said line is blocked and a connection characterized by any one of a plurality of groups of signals representing an unrestricted destination may be established over said line.

References Cited in the file of this patent

UNITED STATES PATENTS

| | | |
|---|---|---|
| 2,039,668 | Stokely | May 5, 1936 |
| 2,040,291 | Bonomi | May 12, 1936 |
| 2,327,877 | Erwin | Aug. 24, 1943 |
| 2,764,634 | Brooks et al. | Sept. 25, 1956 |
| 2,767,248 | Warman | Oct. 16, 1956 |
| 2,813,930 | Berch | Nov. 19, 1957 |